US012132901B2

(12) United States Patent
Xu et al.

(10) Patent No.: US 12,132,901 B2
(45) Date of Patent: Oct. 29, 2024

(54) ADAPTIVE MULTIPLE TRANSFORM SET SELECTION

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/957,959

(22) Filed: Sep. 30, 2022

(65) Prior Publication Data

US 2023/0112642 A1  Apr. 13, 2023

Related U.S. Application Data

(60) Provisional application No. 63/289,110, filed on Dec. 13, 2021, provisional application No. 63/255,365, filed on Oct. 13, 2021.

(51) Int. Cl.
*H04N 19/12* (2014.01)
*H04N 19/176* (2014.01)
(Continued)

(52) U.S. Cl.
CPC ........... *H04N 19/12* (2014.11); *H04N 19/176* (2014.11); *H04N 19/18* (2014.11); *H04N 19/70* (2014.11)

(58) Field of Classification Search
CPC ...... H04N 19/12; H04N 19/176; H04N 19/18; H04N 19/70
See application file for complete search history.

(56) References Cited

U.S. PATENT DOCUMENTS

| 11,245,904 B2* | 2/2022 | Choi | H04N 19/70 |
| 2014/0056361 A1* | 2/2014 | Karczewicz | H04N 19/17 |
| | | | 375/240.18 |

(Continued)

FOREIGN PATENT DOCUMENTS

WO    2020252279 A1    12/2020

OTHER PUBLICATIONS

B. Bross et al., "Overview of the Versatile Video Coding (VVC) Standard and its Applications," in IEEE Transactions on Circuits and Systems for Video Technology, vol. 31, No. 10, pp. 3736-3764, Oct. 2021, doi: 10.1109/TCSVT.2021.3101953.

(Continued)

*Primary Examiner* — Jae N Noh
(74) *Attorney, Agent, or Firm* — ArentFox Schiff LLP

(57) ABSTRACT

Aspects of the disclosure provide a method and an apparatus for video decoding. The apparatus includes processing circuitry that can determine multiple transform selection (MTS) selection information of a plurality of transform coefficient blocks in a coded video bitstream. The MTS selection information indicates at least one of (i) threshold information or (ii) a plurality of MTS candidate subsets for a transform coefficient block in the plurality of transform coefficient blocks. The processing circuitry can determine which MTS candidate subset in the plurality of MTS candidate subsets is selected for the transform coefficient block based on the MTS selection information and inversely transform the transform coefficient block based on an MTS candidate included in the determined MTS candidate subset.

20 Claims, 20 Drawing Sheets

(51) Int. Cl.
*H04N 19/18* (2014.01)
*H04N 19/70* (2014.01)

(56) References Cited

U.S. PATENT DOCUMENTS

2020/0314426 A1  10/2020  Salehifar et al.
2021/0211727 A1   7/2021  Salehifar et al.

OTHER PUBLICATIONS

M.Coban et al., "Algorithm description of Enhanced Compression Model 2 (ECM 2)", Joint Video Experts Team (JVET) of ITU-T SG 16 WP 3 and ISO/IEC JTC 1/SC 29, 23rd Meeting, by teleconference, Jul. 7-16, 2021, Document: JVET-W2025, pp. 1-22.
B.Ray et al., "Non-EE2: Adaptive Intra MTS", Joint Video Experts Team (JVET) of ITU-T SG 16 WP 3 and ISO/IEC JTC 1/SC 29, 24th Meeting, by teleconference, Oct. 6-16, 2021, Document: JVET-X0135, pp. 1-3.
International Search Report and Written Opinion issued Jan. 11, 2023 in Application No. PCT/US2022/077524, 10 pages.

\* cited by examiner

| Transform Type | Basis function $T_i(j)$, $i,j=0,1,\ldots,N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

*FIG. 11*

| Transform Types | Description | Prediction mode | |
|---|---|---|---|
| | | Intra | Inter |
| DCT_DCT | DCT ↓ and → | ✓ (all block sizes) | ✓ (all block sizes) |
| ADST_DCT | ADST ↓; DCT → | ✓ (block size ≤ 16×16) | ✓ (block size ≤ 16×16) |
| DCT_ADST | DCT ↓; ADST → | | |
| ADST_ADST | ADST ↓ and → | | |
| FLIPADST_DCT | FLIPADST ↓; DCT → | ✗ | ✓ (block size ≤ 16×16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16×16) | ✓ (block size ≤ 32×32) |
| V_DCT | DCT ↓; IDTX → | ✓ (block size < 16×16) | ✓ (block size ≤ 16×16) |
| H_DCT | IDTX ↓; DCT → | | |
| V_ADST | ADST ↓; IDTX → | ✗ | ✓ (block size < 16×16) |
| H_ADST | IDTX ↓; ADST → | | |
| V_FLIPADST | FLIPADST ↓; IDTX → | ✗ | ✓ |
| H_FLIPADST | IDTX ↓; FLIPADST → | | |

*FIG. 12*

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

FIG. 13

ADAPTIVE MULTIPLE TRANSFORM SET SELECTION

INCORPORATION BY REFERENCE

The present application claims the benefit of priority to U.S. Provisional Application No. 63/255,365, "ADAPTIVE MULTIPLE TRANSFORM SET SELECTION" filed on Oct. 13, 2021 and U.S. Provisional Application No. 63/289,110, "METHOD AND APPARATUS FOR ADAPTIVE MULTIPLE TRANSFORM SET SELECTION" filed on Dec. 13, 2021, which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B1, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to determine multiple transform selection (MTS) selection information of a plurality of transform coefficient blocks in a coded video bitstream. The MTS selection information indicates at least one of (i) threshold information or (ii) a plurality of MTS candidate subsets for a transform coefficient block in the plurality of transform coefficient blocks. The processing circuitry can determine which MTS candidate subset in the plurality of MTS candidate subsets is selected for the transform coefficient block based on the MTS selection information and inversely transform the transform coefficient block based on an MTS candidate included in the determined MTS candidate subset.

In an embodiment, the MTS selection information is signaled in the coded video bitstream.

In an example, the MTS selection information indicates the threshold information that includes at least one threshold. The processing circuitry can determine the MTS candidate subset based on the at least one threshold and one of (i) a number of non-zero coefficients in the transform coefficient block or (ii) a position of the last significant coefficient in a scanning order in the transform coefficient block.

In an example, a number of the plurality of MTS candidate subsets is a sum of a number of the at least one threshold and 1. The processing circuitry can determine the plurality of MTS candidate subsets based on the number of the plurality of MTS candidate subsets. The processing circuitry can determine the MTS candidate subset further based on the plurality of MTS candidate subsets.

In an example, the MTS selection information includes one or more numbers. Each number of the one or more numbers can be a number of one or more MTS candidates in a respective one of one or more MTS candidate subsets in the plurality of MTS candidate subsets. The processing circuitry can determine the plurality of MTS candidate subsets based on the one or more numbers and an MTS candidate set and determine the MTS candidate subset based on the plurality of MTS candidate subsets.

In an example, the plurality of MTS candidate subsets includes a last MTS candidate subset that is not included in the one or more MTS candidate subsets, and the last MTS candidate subset is the MTS candidate set.

In an example, the plurality of MTS candidate subsets includes a first MTS candidate subset that is not included in the one or more MTS candidate subsets, and the first MTS candidate subset consists of a default MTS candidate in the MTS candidate set.

In an example, the high level syntax header is a slice header, a picture header, a picture parameter set (PPS), a video parameter set (VPS), an adaptation parameter set (APS), or a sequence parameter set (SPS).

In an example, the MTS selection information is determined based on multiple previously decoded transform coefficient blocks in a previously decoded region.

In an example, the MTS selection information indicates the threshold information that includes at least one threshold of the plurality of transform coefficient blocks. The processing circuitry can determine the at least one threshold based on coefficient information of the multiple previously decoded transform coefficient blocks. The processing circuitry can determine the MTS candidate subset based on the at least one threshold and one of (i) a number of non-zero coefficients in the transform coefficient block or (ii) a position of the last significant coefficient in a scanning order in the transform coefficient block.

In an example, the coefficient information of the multiple previously decoded transform coefficient blocks indicates (i) an average number of non-zero coefficients of the multiple previously decoded transform coefficient blocks or (ii) an average position of the last significant coefficient in a scanning order of the multiple previously decoded transform coefficient blocks.

In an example, the MTS selection information indicates the threshold information that includes at least one threshold of the plurality of transform coefficient blocks. Multiple pieces of coefficient information are associated with the multiple previously decoded transform coefficient blocks. Each of the multiple pieces of coefficient information corresponds to a respective type of multiple types of block sizes in the previously decoded region. The processing circuitry can determine the at least one threshold based on a piece of coefficient information corresponding to a respective type of block sizes to which the transform coefficient block belong. The processing circuitry can determine the MTS candidate subset based on the at least one threshold and one of (i) a number of non-zero coefficients in the transform coefficient block or (ii) a position of the last significant coefficient in a scanning order in the transform coefficient block.

In an example, the MTS selection information indicates the plurality of MTS candidate subsets. The processing circuitry can determine for the plurality of transform coefficient blocks, based on statistics information of transform types of the multiple previously decoded transform coefficient blocks, MTS candidates and an order of the MTS candidates that are used to form the plurality of MTS candidate subsets from an MTS candidate set. The processing circuitry can determine the plurality of MTS candidate subsets from the MTS candidate set based on the MTS candidates and the order of the MTS candidates and determine the MTS candidate subset to be one of the plurality of MTS candidate subsets.

In an example, the MTS selection information indicates the plurality of MTS candidate subsets. Multiple pieces of statistics information of transform types are associated with the multiple previously decoded transform coefficient blocks. Each of the multiple pieces of statistics information of transform types corresponds to a respective type of multiple types of block sizes in the previously decoded region. The processing circuitry can determine for the transform coefficient block, based on a piece of statistics information of transform types corresponding to a type of block sizes to which the transform coefficient block belong, MTS candidates and an order of the MTS candidates that is used to form the plurality of MTS candidate subsets from an MTS candidate set. The processing circuitry can determine the plurality of MTS candidate subsets from the MTS candidate set based on the MTS candidates and the order of the MTS candidates and determine the MTS candidate subset to be one of the plurality of MTS candidate subsets.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 11 shows examples of primary transform basis functions.

FIG. 12 shows exemplary dependencies of the availability of a transform kernel based on a transform block size and a prediction mode.

FIG. 13 shows exemplary transform type selections based on an intra prediction mode.

DETAILED DESCRIPTION OF EMBODIMENTS

Figure 1A:
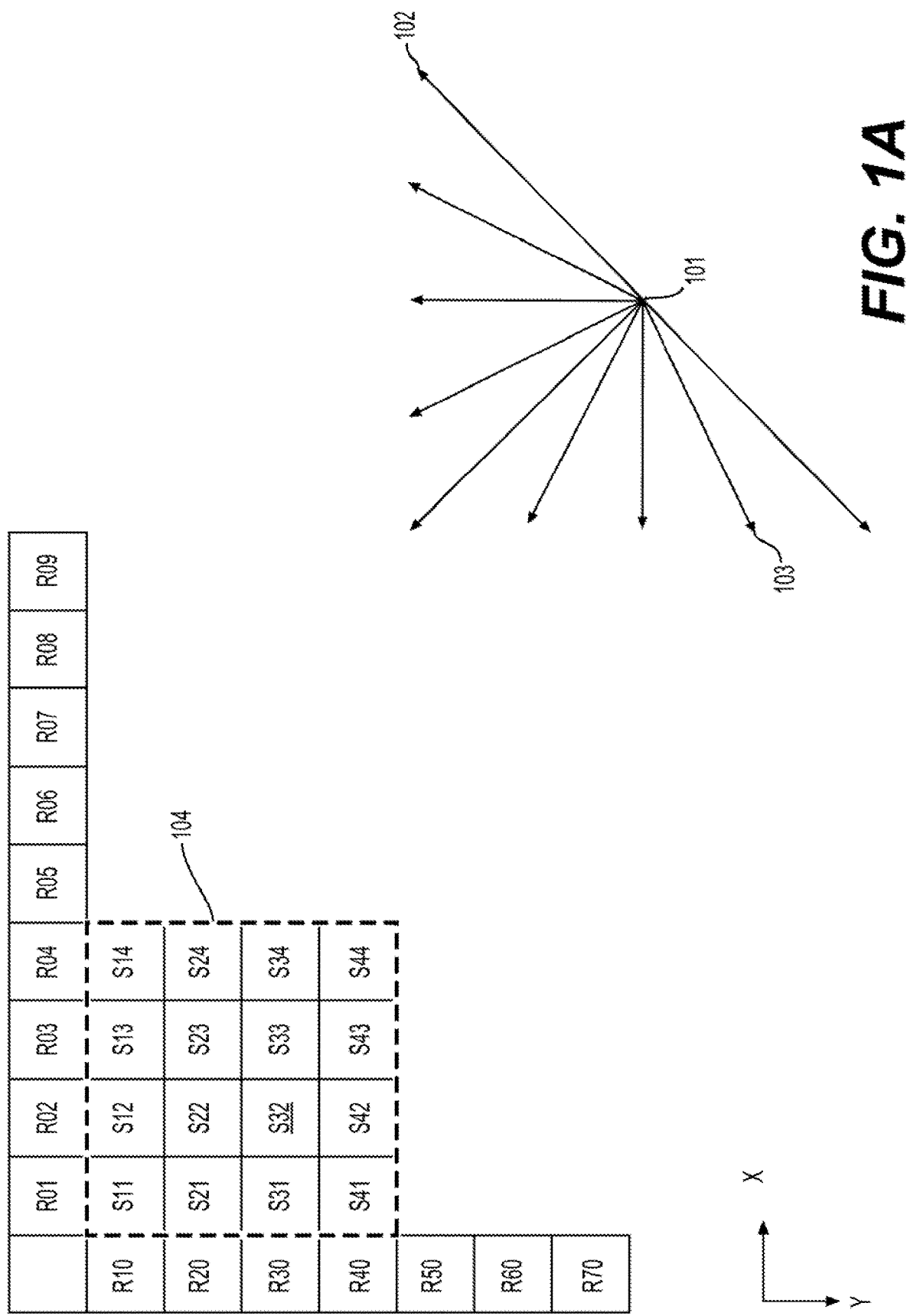
FIG. 1A is a schematic illustration of an exemplary subset of intra prediction modes.
Figure 1B:
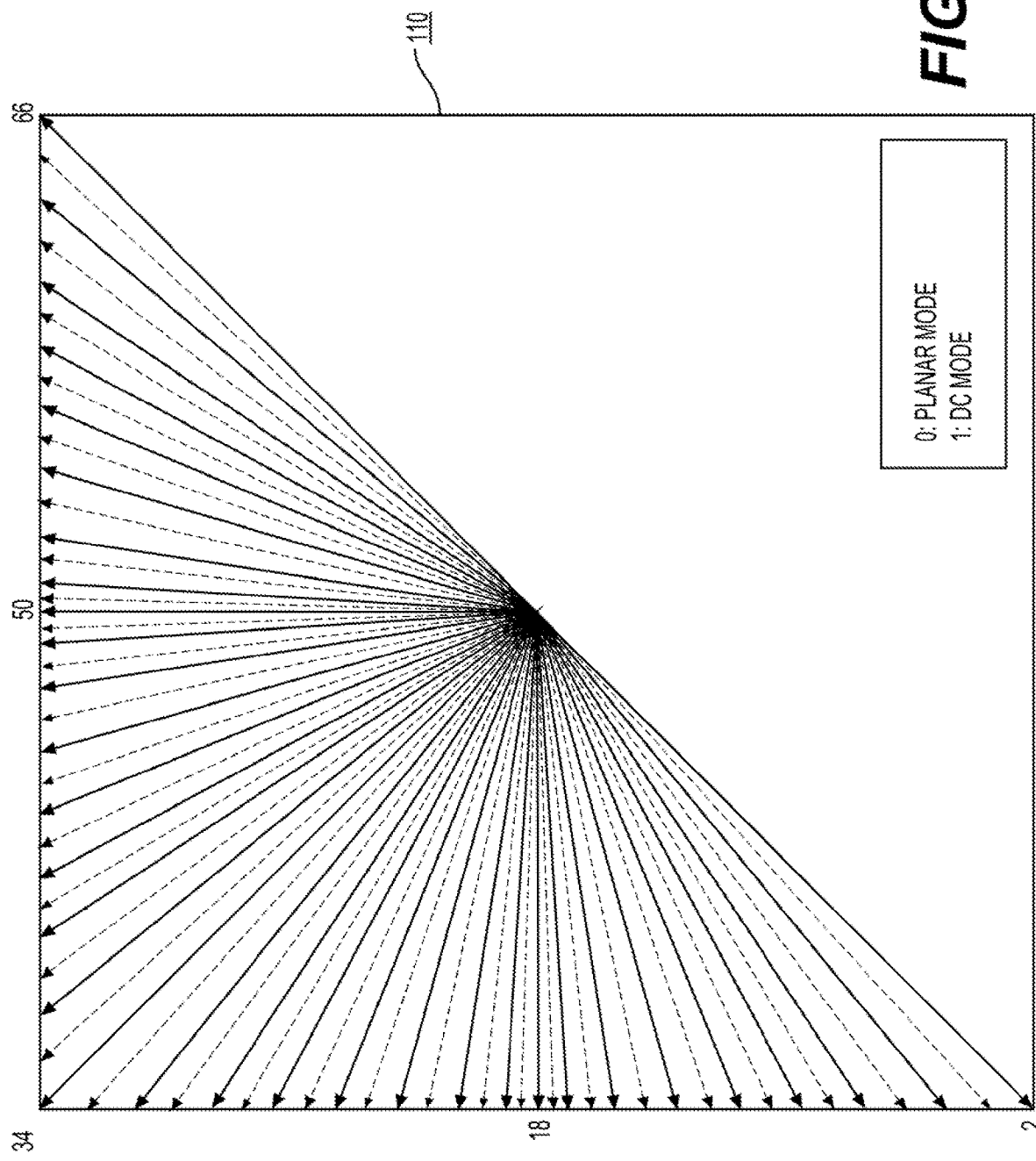
FIG. 1B is an illustration of exemplary intra prediction directions.
Figure 2:
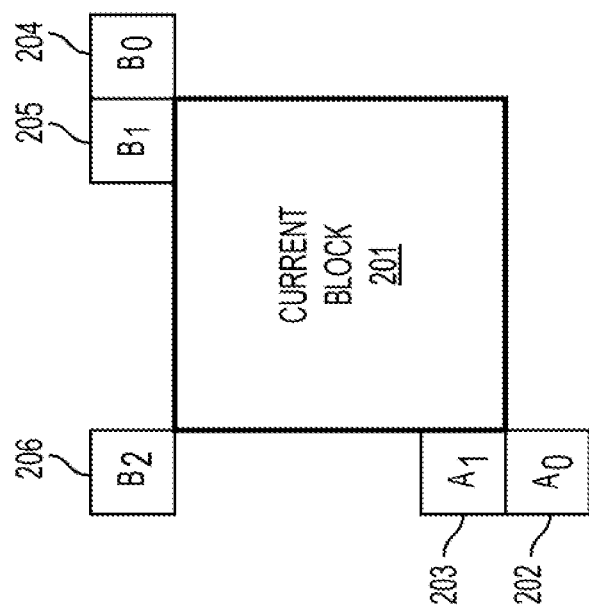
FIG. 2 shows an example of a current block (201) and surrounding samples.
Figure 3:
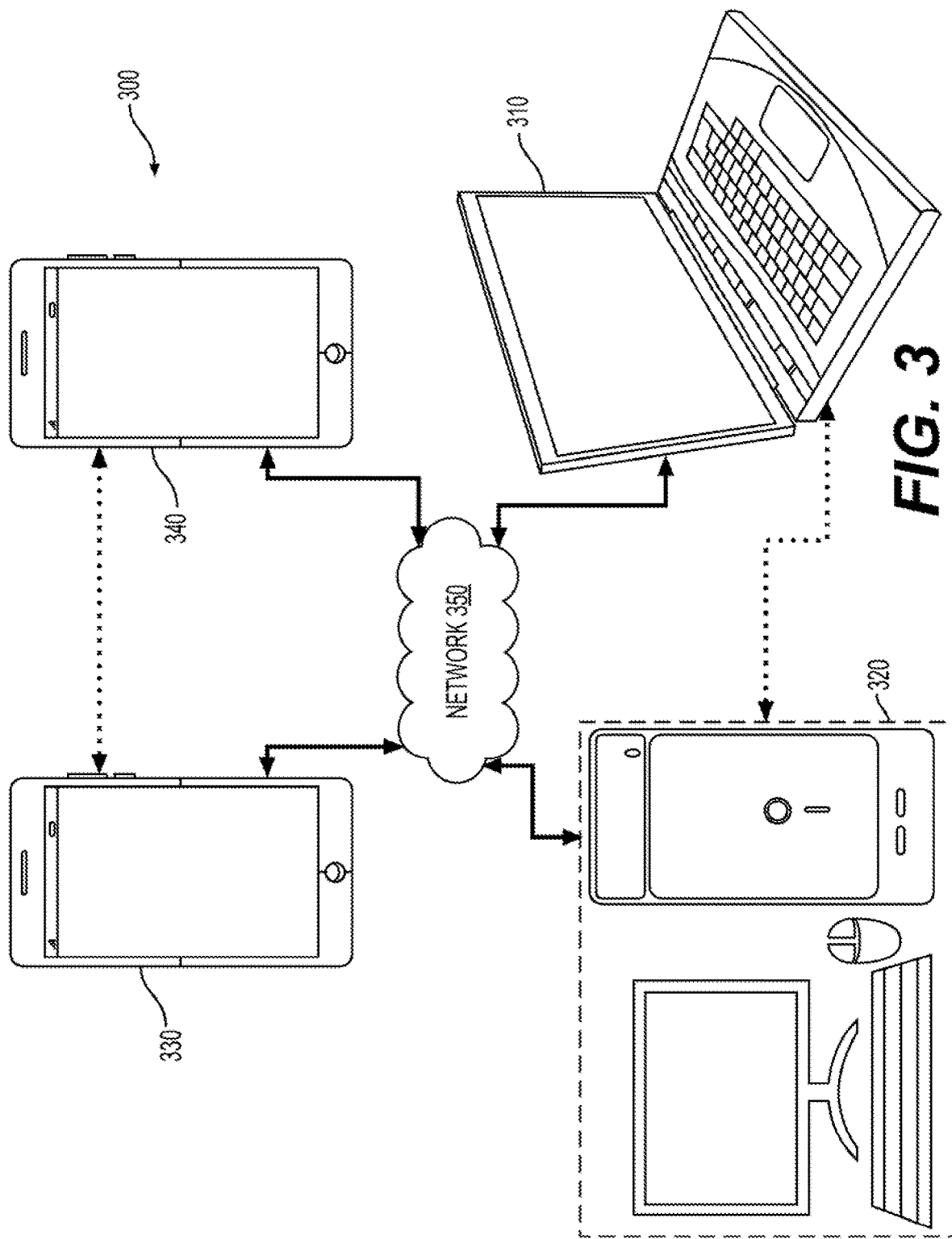
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
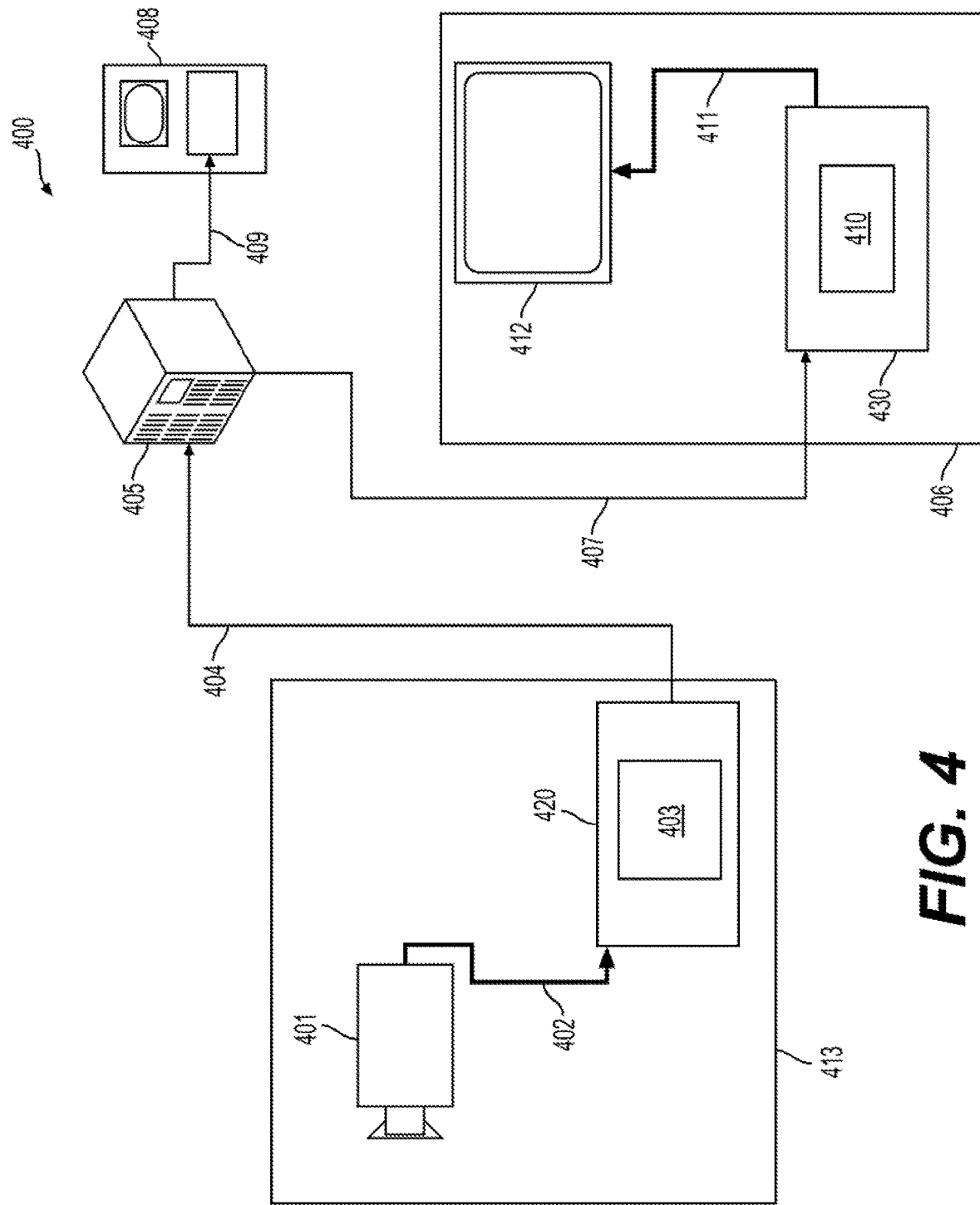
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
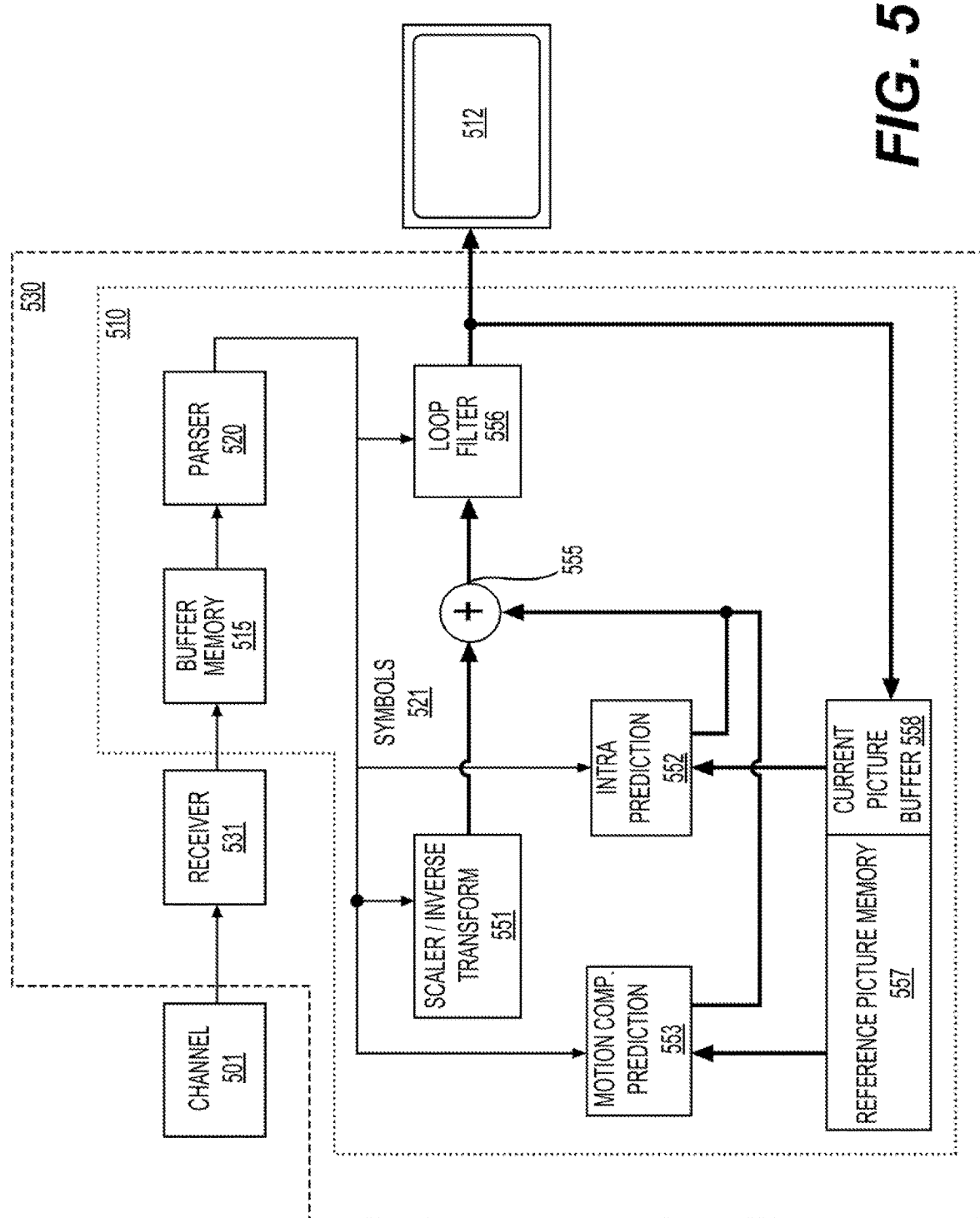
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
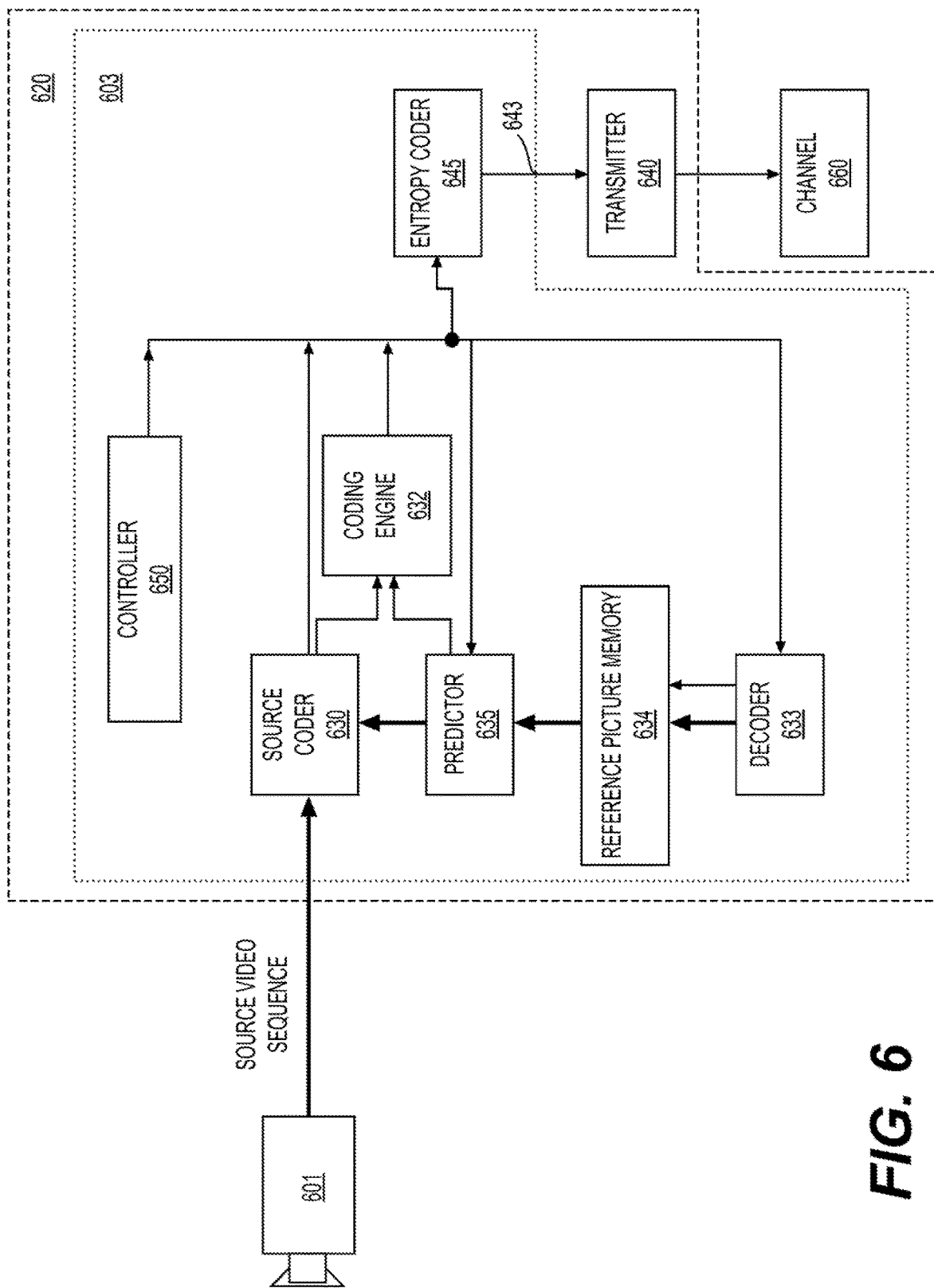
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
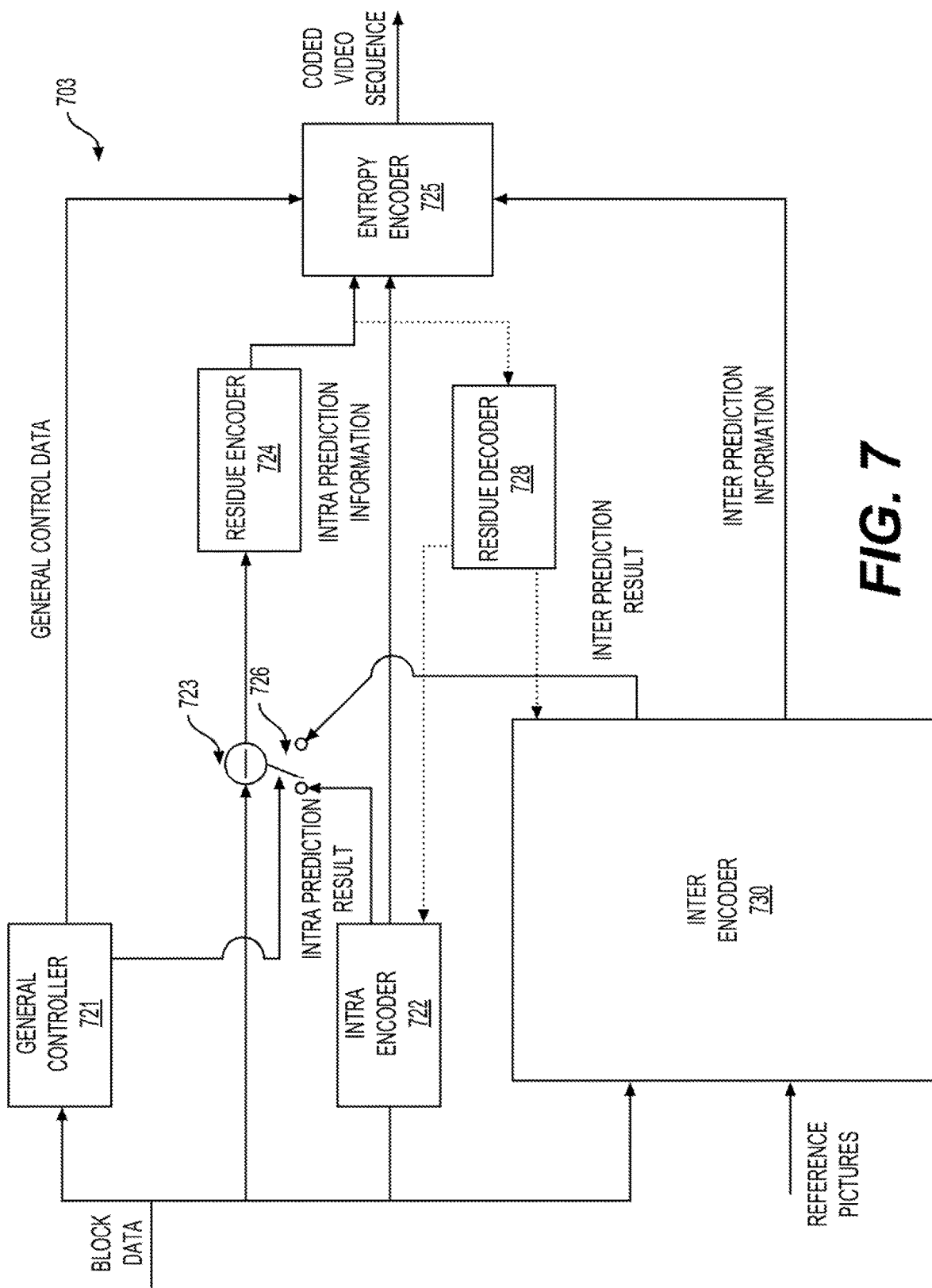
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
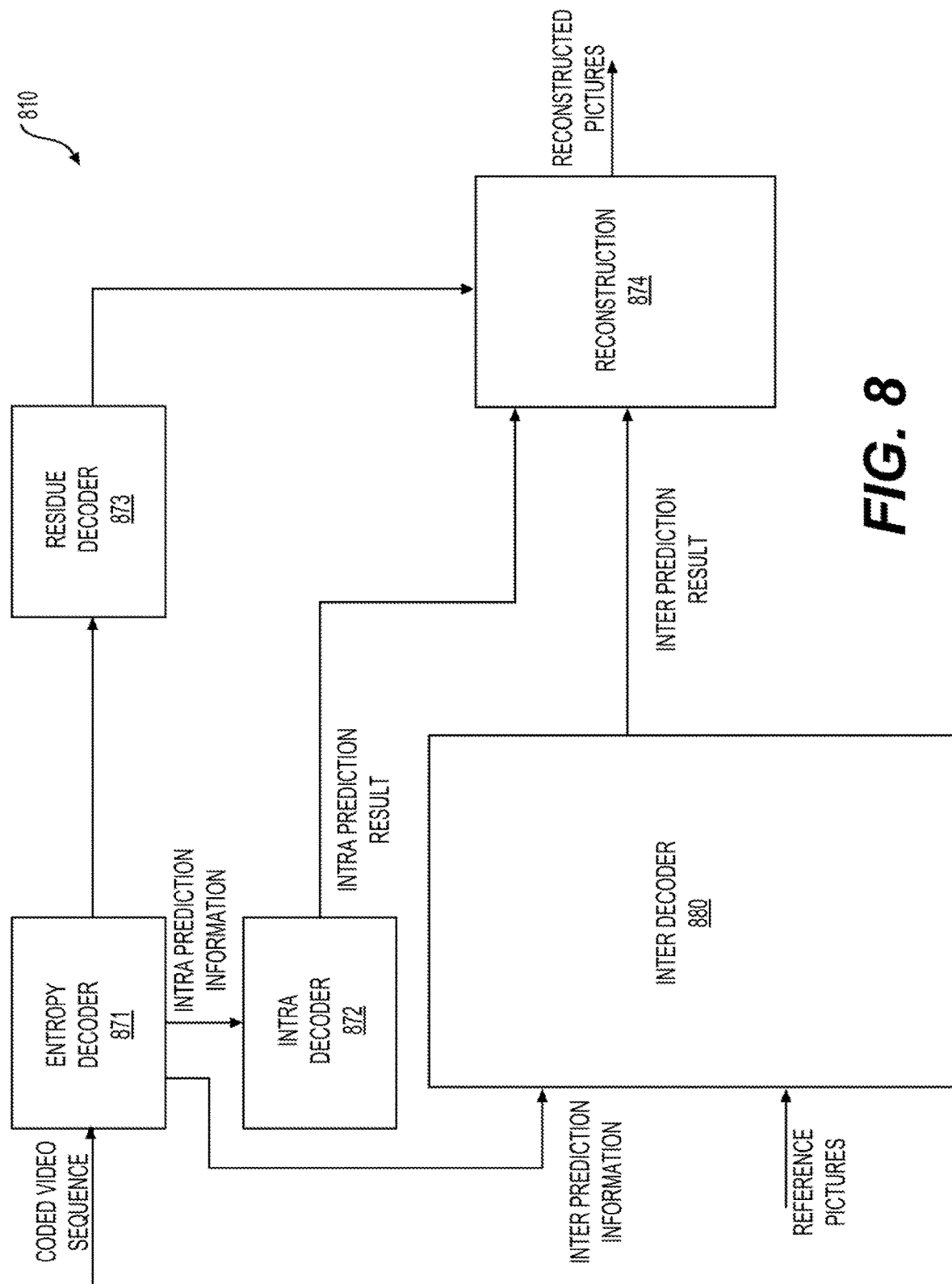
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various intra prediction modes can be used in intra prediction, for example, in AOMedia Video 1 (AV1), Versatile Video Coding (VVC), and/or the like. In an embodiment, such as in the AV1, directional intra prediction is used. In an example, such as in an open video coding format VP9, eight directional modes corresponding to eight angles from 45° to 207°. To exploit more varieties of spatial redundancy in directional textures, for example in the AV1, directional modes (also referred to as directional intra modes, directional intra prediction modes, angular modes) can be extended to an angular set with finer granularity, as shown in FIG. 9.

Figure 9:
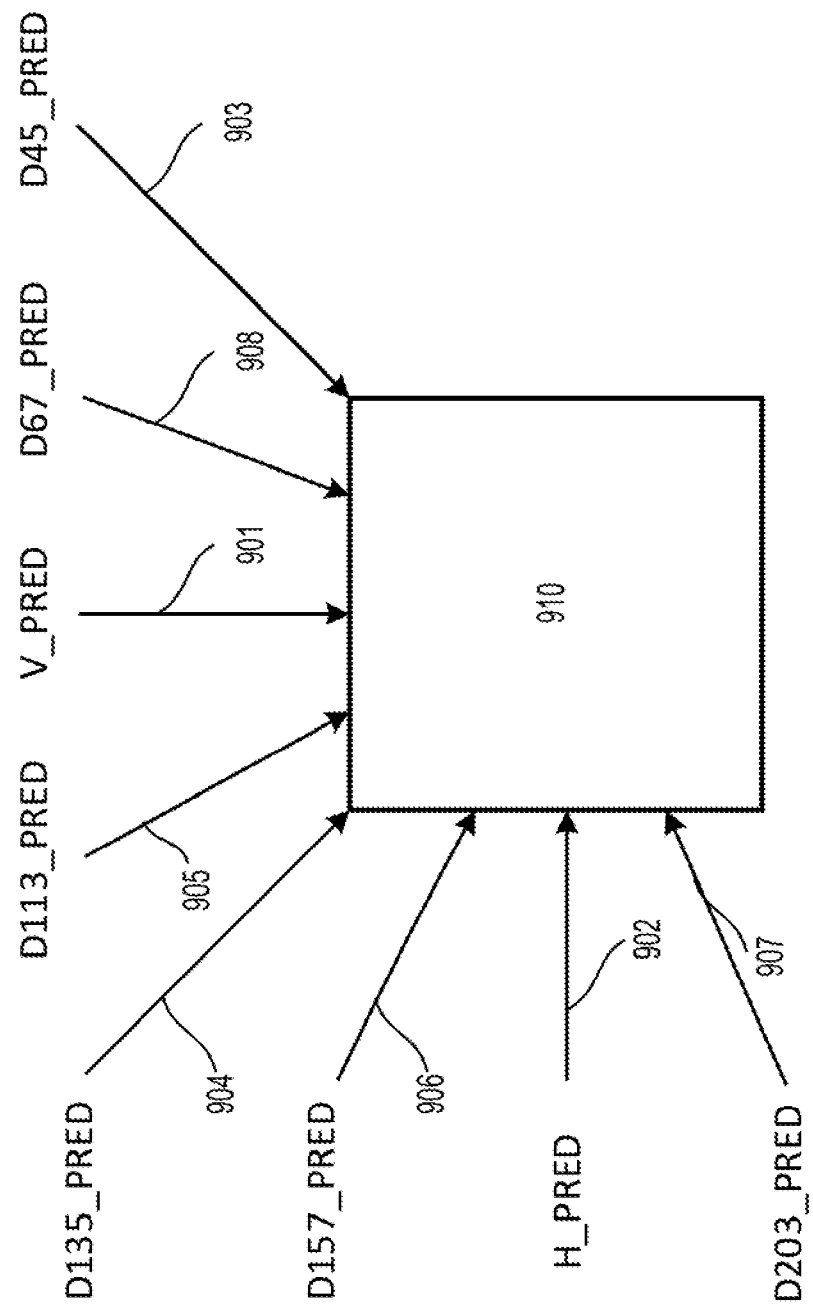
FIG. 9 shows an example of nominal modes for a coding block.

FIG. 9 shows an example of nominal modes for a coding block (CB) (910) according to an embodiment of the disclosure. Certain angles (referred to as nominal angles) can correspond to nominal modes. In an example, eight nominal angles (or nominal intra angles) (901)-(908) correspond to eight nominal modes (e.g., V_PRED, H_PRED, D45_PRED, D135_PRED, D113_PRED, D157_PRED, D203_PRED, and D67_PRED), respectively. The eight nominal angles (901)-(908) as well as the eight nominal modes can be referred to as V_PRED, H_PRED, D45_PRED, D135_PRED, D113_PRED, D157_PRED, D203_PRED, and D67_PRED, respectively. Further, each nominal angle can correspond to a plurality of finer angles (e.g., seven finer angles), and thus 56 angles (or prediction angles) or 56 directional modes (or angular modes, directional intra prediction modes) can be used, for example, in the AV1. Each prediction angle can be presented by a nominal angle and an angular offset (or an angle delta). The angular offset can be obtained by multiplying an offset integer I (e.g., −3, −2, −1, 0, 1, 2, or 3) with a step size (e.g., 3°). In an example, the prediction angle is equal to a sum of the nominal angle and the angular offset. In an example, such as in the AV1, the nominal modes (e.g., the eight nominal modes (901)-(908)) together with certain non-angular smooth modes (e.g., five non-angular smooth modes such as a DC mode, a PAETH mode, a SMOOTH mode, a vertical SMOOTH mode, and a horizontal SMOOTH mode as described below) can be signaled. Subsequently, if a current prediction mode is a directional mode (or an angular mode), an index can be further signaled to indicate the angular offset (e.g., the offset integer I) corresponding to the nominal angle. In an example, to implement directional prediction modes via a generic way, the 56 directional modes such as used in the AV1 are implemented with a unified directional predictor that can project each pixel to a reference sub-pixel location and interpolate the reference pixel by a 2-tap bilinear filter.

Non-directional smooth intra predictors (also referred to as non-directional smooth intra prediction modes, non-directional smooth modes, non-angular smooth modes) can be used in intra prediction for a block, such as a CB. In some examples (e.g., in the AV1), five non-directional smooth intra prediction modes include the DC mode or the DC predictor (e.g., DC), the PAETH mode or the PAETH predictor (e.g., PAETH), the SMOOTH mode or the SMOOTH predictor (e.g., SMOOTH), the vertical SMOOTH mode (referred to as the SMOOTH_V mode, the SMOOTH_V predictor, the SMOOTH_V), and the horizontal SMOOTH mode (referred to as the SMOOTH_H mode, the SMOOTH_H predictor, or SMOOTH_H).

Figure 10:
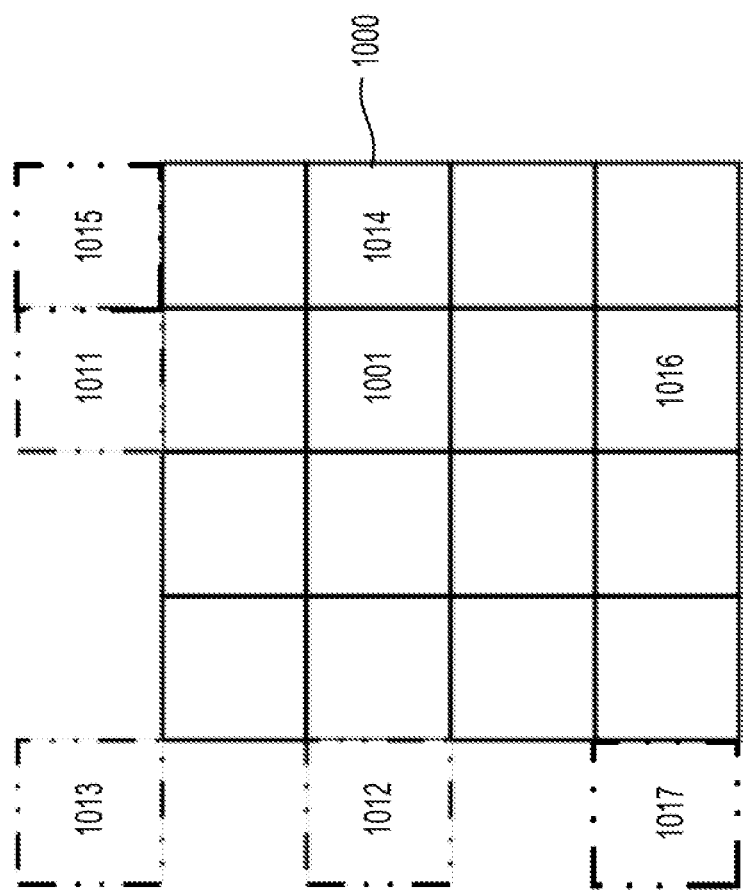
FIG. 10 shows examples for non-directional smooth intra prediction modes.

FIG. 10 shows examples for non-directional smooth intra prediction modes (e.g., the DC mode, the PAETH mode, the SMOOTH mode, the SMOOTH_V mode, and the SMOOTH_H mode) according to aspects of the disclosure. To predict a sample (1001) in a CB (1000) based on the DC predictor, an average of a first value of a left neighboring sample (1012) and a second value of an above neighboring sample (or a top neighboring sample) (1011) can be used as a predictor.

To predict the sample (1001) based on the PAETH predictor, the first value of the left neighboring sample (1012), the second value of the top neighboring sample (1011), and a third value for a top-left neighboring sample (1013) can be obtained. Then, a reference value is obtained using Eq. 1.

$$\text{reference value} = \text{first value} + \text{second value} - \text{third value} \quad \text{(Eq. 1)}$$

One of the first value, the second value, and the third value that is closest to the reference value can be set as the predictor for the sample (1001).

The SMOOTH_V mode, the SMOOTH_H mode, and the SMOOTH mode can predict the CB (1000) using a quadratic interpolation in a vertical direction, a horizontal direction, and an average of the vertical direction and the horizontal direction, respectively. To predict the sample (1001) based on the SMOOTH predictor, an average (e.g., a weighted combination) of the first value, the second value, a value of a right sample (1014), and a value of a bottom sample (1016) can be used. In various examples, the right sample (1014) and the bottom sample (1016) are not reconstructed, and thus, a value of a top-right neighboring sample (1015) and a value of a bottom-left neighboring sample (1017) can replace the values of the right sample (1014) and the bottom sample (1016), respectively. Accordingly, an average (e.g., a weighted combination) of the first value, the second value, the value of the top-right neighboring sample (1015), and the value of the bottom-left neighboring sample (1017) can be used as the SMOOTH predictor. To predict the sample (1001) based on the SMOOTH_V predictor, an average (e.g., a weighted combination) of the second value of the top neighboring sample (1011) and the value of the bottom-left neighboring sample (1017) can be used. To predict the sample (1001) based on the SMOOTH_H predictor, an average (e.g., a weighted combination) of the first value of the left neighboring sample (1012) and the value of the top-right neighboring sample (1015) can be used.

Embodiments of primary transforms, such as embodiments used in AV1, are described below. To support various coding block partitions, multiple transform sizes (e.g., ranging from 4-point to 64-point for each dimension) and various transform shapes (e.g., square, a rectangular shape with a width over a height ratio of 2:1, 1:2, 4:1, or 1:4) can be used, such as in AV1.

A 2D transform process can use hybrid transform kernels that can include a different 1D transform for each dimension of a coded residual block. Primary 1D transforms can include (a) a 4-point, an 8-point, a 16-point, a 32-point, a 64-point DCT-2 (or DCT2); (b) a 4-point, an 8-point, a 16-point asymmetric DST (ADST) (e.g., a DST-4 or DST4, a DST-7 or DST7) and corresponding flipped versions (e.g., a flipped version or a FlipADST of an ADST can apply the ADST in a reverse order); and/or (c) a 4-point, an 8-point, a 16-point, a 32-point identity transform (IDTX or IDT). FIG. 11 shows examples of primary transform basis functions. The primary transform basis functions in the FIG. 11 example include basis functions for the DCT-2 and the asymmetric DSTs (e.g., DST-4 and DST-7) having an N-point input. The primary transform basis functions shown in FIG. 11 can be used in AV1.

The availability of hybrid transform kernels can be dependent on a transform block size and a prediction mode. FIG. 12 shows exemplary dependencies of the availability of various transform kernels (e.g., transform types shown in the first column and described in the second column) based on the transform block size (e.g., sizes shown in the third column) and the prediction mode (e.g., intra prediction and inter prediction shown in the third column). The exemplary hybrid transform kernels and the availability based on the prediction modes and transform block sizes can be used in AV1 for example. Referring to FIG. 12, symbols "→" and "↓" denote a horizontal dimension (also referred to as a horizontal direction) and a vertical dimension (also referred to as a vertical direction), respectively. Symbols "✓" and "x" denote the availability of a transform kernel for the corresponding block size and the prediction mode. For example, the symbol "✓" denotes that the transform kernel is available, and the symbol "x" denotes that the transform kernel is unavailable.

In an example, a transform type denoted by ADST_DCT in the first column of FIG. 12 includes an ADST in the vertical direction and a DCT in the horizontal direction as shown in the second column of FIG. 12. According to the third column of FIG. 12, the transform type ADST_DCT is available for the intra prediction and the inter prediction when the block size is less than or equal to 16×16 (e.g., 16×16 samples, 16×16 luma samples).

In an example, a transform type denoted by V_ADST as shown in the first column of FIG. 12 includes an ADST in the vertical direction and an IDTX (i.e., an identity matrix) in the horizontal direction as shown in the second column of FIG. 12. Thus, the transform type V_ADST is performed in the vertical direction and is not performed in the horizontal direction. According to the third column of FIG. 12, the transform type V_ADST is not available for the intra prediction regardless of the block size. The transform type V_ADST is available for the inter prediction when the block size is less than 16×16 (e.g., 16×16 samples, 16×16 luma samples).

In an example, FIG. 12 is applicable for a luma component. For a chroma component, a transform type (or a transform kernel) selection can be performed implicitly. In an example, for intra prediction residuals, the transform type can be selected according to an intra prediction mode, as shown in FIG. 13. FIG. 13 shows exemplary transform type selections based on an intra prediction mode. In an example, transform type selections shown in FIG. 13 are applicable to a chroma component. For inter prediction residuals, the transform type can be selected according to the transform type selection of a co-located luma block. Therefore, in an example, a transform type for the chroma component is not signaled in a bitstream.

The disclose includes embodiments related to adaptive multiple transform set selection.

An Enhanced Compression Model (ECM)-2.0 reference software can be provided to demonstrate a reference implementation of encoding techniques and decoding process(es) for Joint Video Experts Team (WET) enhanced compression beyond Versatile Video Coding (VVC) capability exploration work.

In an embodiment, such as in ECM-2.0, multiple (e.g., 4) different multiple transform selection (MTS) candidates are used in addition to DCT2. A transform pair (e.g., including a vertical transform along the vertical direction and a horizontal transform along the horizontal direction) associated with each MTS candidate can be dependent on a TU size (e.g., a TB size or a transform block size) and/or a prediction mode, such as an intra mode (e.g., intra prediction mode), as shown in FIGS. 12-13. In an embodiment, a transform pair can be constructed using non-DCT2 transform kernels, such as DST7, DCT8, DCT5, DST4, DST1, and an identity transform (IDT).

An MTS index (e.g., denoted as mts_idx) can indicate which MTS candidate is selected from the multiple MTS candidates. The MTS index (e.g., mts_idx) can be signaled or inferred. The MTS index (e.g., mts_idx) can be signaled when a block (e.g., a TB) includes at least one non-DC coefficient, for example, when a position of the last significant coefficient in a scanning order is greater than 0. A TB including coefficient(s) can be referred to as a transform coefficient block. In an example, the MTS index (e.g., mts_idx) is signaled only when the block (e.g., the TB) includes at least one non-DC coefficient, for example, when the position of the last significant coefficient in the scanning order is greater than 0. Otherwise, the MTS index (e.g., mts_idx) is not signaled, and the transform can be inferred to be DCT2 (e.g., mts_idx being 0), for example, when the block (e.g., the TB) includes at least one non-DC coefficient. To signal the MTS index (e.g., mts_idx), the first bin of the MTS index can indicate whether the MTS index is greater than 0 or not. If the MTS index is greater than 0, additional M bits (e.g., 2 bits) using a fixed length code can be signaled to indicate the signaled MTS candidate in the multiple (e.g., four) MTS candidates. M can be a positive integer.

In some embodiments, such as in related MTS methods, a fixed number (e.g., 4) of MTS candidates is used. Using the fixed number of MTS candidates may not be optimal as residual characteristics of a block (e.g., a TB) are not considered. For example, a block (e.g., a TB) having less residual energy or a smaller number of coefficients (e.g., a smaller number of non-DC coefficients) may benefit from a reduced number of MTS candidates since overhead signaling can be reduced when a number of MTS candidates is reduced. A block (e.g., a TB) with higher residual energy or a larger number of coefficients (e.g., a larger number of non-DC coefficients) may benefit from a higher number of MTS candidates since a higher number of MTS candidates can provide more variety to the MTS candidate selection.

In some embodiments, a variable number (e.g., 1, 4 or 6) of MTS candidates can be selected depending on a position (e.g., lastScanPos) of the last significant coefficient in the scanning order. A smaller MTS candidate set having a smaller number of MTS candidates can be a subset of a larger MTS candidate set (e.g., an immediate larger MTS candidate set) having a larger number of MTS candidates, such as shown in FIG. 14.

Figure 14:
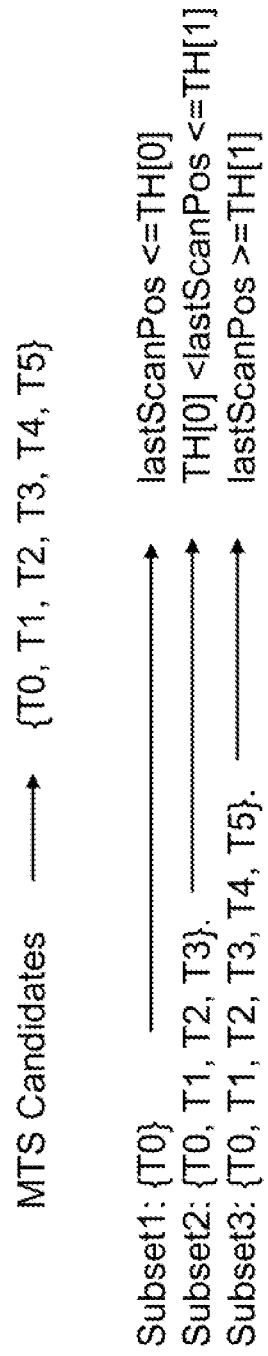
FIG. 14 shows an example of multiple transform selection (MTS) candidates and a selection of an MTS candidate subset according to a position of the last significant coefficient in a scanning order.

FIG. 14 shows an example of MTS candidates and a selection of an MTS candidate subset according to a position (e.g., lastScanPos) of the last significant coefficient in a scanning order. An MTS candidate set (e.g., a full MTS candidate set) includes multiple MTS candidates. The multiple MTS candidates can include any transform or any transform type. A number of the multiple MTS candidates can be any positive number. In an example, the number of the multiple MTS candidates in the MTS candidate set is larger than 1. In the example in FIG. 14, the MTS candidate set (e.g., the full MTS candidate set) includes the multiple MTS candidates T0-T5. For example, the multiple MTS candidates T0-T5 include six candidates in DCT2, DST7, DCT8, DCT5, DST4, DST1, and IDT. In an example, the multiple MTS candidates T0-T5 correspond to DCT2, DST7, DCT8, DCT5, DST4, and DST1, respectively. In an example, the multiple MTS candidates T0-T5 correspond to DST7, DCT8, DCT5, DST4, DST1, and IDT, respectively.

Multiple MTS candidate subsets can be determined based on the MTS candidate set. For example, one or more thresholds (TH), such as a first threshold TH[0] (e.g., 6) and a second threshold TH[1] (e.g., 32), are used to determine the multiple MTS candidate subsets. In the example of FIG. 14, the one or more thresholds are fixed thresholds, such as TH[0] being 6 and TH[1] being 32. Referring to FIG. 14, the multiple MTS candidate subsets include a first MTS candidate subset, a second MTS candidate subset, and a third MTS candidate subset. The first MTS candidate subset includes one MTS candidate, such as T0. The second MTS candidate subset includes four MTS candidates, such as T0-T3. The third MTS candidate subset includes six MTS candidates, such as T0-T5. In FIG. 14, the third MTS candidate subset is the full MTS candidate set.

Referring to FIG. 14, when a position (e.g., lastScanPos) of the last significant coefficient in the scanning order of a block (e.g., a TB) is less than or equal to the first threshold TH[0], an MTS candidate subset of the block is the first MTS candidate subset. When the position (e.g., lastScanPos) of the last significant coefficient in the scanning order of the block (e.g., the TB) is (i) less than or equal to the second threshold TH[1] and (ii) larger than the first threshold TH[0], an MTS candidate subset of the block is the second MTS candidate subset. When the position (e.g., lastScanPos) of the last significant coefficient in the scanning order of the block (e.g., the TB) is larger than or equal to the second threshold TH[1], an MTS candidate subset of the block is the third MTS candidate subset.

In the example of FIG. 14, no additional non-DCT2 transform kernels are used as compared to ECM-2.0. A TU shape and intra mode dependency remains unchanged from ECM-2.0.

In various embodiments, determining a MTS candidate subset based on fixed threshold(s) (e.g., TH[0] being 6 and TH[1] being 32 in FIG. 14) may not optimally adapt to (i) a content of an image and/or a video and/or (ii) a coding condition. The disclosure includes embodiments of adaptive MTS subset selection where adaptive methods can be used to determine an MTS subset selection for a block (e.g., a TB).

The embodiments described in the disclosure can be applied individually or by any form of combinations. Transforms or transform types included in an MTS candidate set can include any transforms, and are not limit to T0-T5 described with reference to FIG. 14. The term block may be interpreted as a prediction block, a transform block, a coding block, a coding unit (CU), or the like.

According to an embodiment, how to determine (e.g., select) an MTS candidate subset for a TB (e.g., a transform coefficient block) can be signaled, for example, at a high level, such as in a high level syntax (HLS) header. A plurality of TBs (e.g., transform coefficient blocks) can refer to the HLS header. MTS selection information of the plurality of TBs can be signaled in the HLS header. The MTS selection information can indicate which MTS candidate(s) of an MTS candidate set are included in the MTS candidate subset for the TB.

The high level can be higher than a block level. The HLS header can include, but is not limited to a slice header, a picture header, a picture parameter set (PPS), a video parameter set (VPS), an adaptation parameter set (APS), a sequence parameter set (SPS), or the like.

The MTS candidate set (e.g., the full MTS candidate set) can be pre-defined. In an example, the MTS candidate set is agreed by, or predetermined for, an encoder and a decoder. In the example in FIG. 14, the full MTS candidate set is {T0, T1, T2, T3, T4, T5}. Possible transforms used to form MTS candidate subsets (e.g., the first MTS candidate subset, the second MTS candidate subset, and the third MTS candidate subset in FIG. 14) can be derived from the full MTS candidate set. In an example, the MTS selection information is used by the plurality of TBs to form the MTS candidate subsets.

At the block level (e.g., the TB level), the MTS candidate subset for the TB can be determined based on actively used information, such as (i) threshold information indicating one or more thresholds for counting coefficients, and (ii) MTS candidate subsets that can be formed from the full MTS candidate set. The threshold(s) and the MTS candidate subsets can be determined (e.g., derived) from the HLS header that the block (e.g., the TB) refers to.

In an embodiment, the threshold information indicating the one or more thresholds (e.g., TH[0], TH[1]) are signaled. For example, the MTS selection information in the HLS header indicates the one or more thresholds. As described in FIG. 14, the MTS candidate subset for the TB can be determined based on the one or more thresholds and coefficient information of the TB. The coefficient information of the TB can indicate a number of non-zero coefficients in the TB or a position (e.g., lastScanPos) of the last significant coefficient in the scanning order of the TB. In an example, the MTS candidate subset for the TB is determined based on a comparison of the one or more thresholds with (i) the number of non-zero coefficients in the TB or (ii) the position (e.g., lastScanPos) of the last significant coefficient in the scanning order of the TB.

In an example, a number (e.g., 2 for TH[0] and TH[1]) of the one or more thresholds is signaled. In an example, the number (e.g., 2 for TH[0] and TH[1]) of the one or more thresholds is not signaled. A number of different MTS candidate subsets can be derived from the number of the one or more thresholds. For example, the number of different MTS candidate subsets is equal to the number of the one or more thresholds plus 1. Referring to FIG. 14, the two thresholds TH[0] and TH[1] are signaled, and three MTS candidate subsets of MTS can be used.

In an embodiment, the MTS selection information indicating transform selection(s) in one or more MTS candidate subsets is signaled. The MTS selection information may be signaled in the HLS header. The MTS selection information can indicate a number of transforms (e.g., MTS candidates) in each of the one or more MTS candidate subsets. In an example, the number of transforms in each of the one or more MTS candidate subsets is signaled. In the example of FIG. 14, numbers 1, 4, and 6 are signaled indicating that three MTS candidate subsets are formed. The three MTS candidate subsets include 1, 4, and 6 transforms (e.g., MTS candidates), respectively. The three MTS candidate subsets can be determined based on (i) the numbers 1, 4, and 6 and (ii) the MTS candidate set (e.g., T0-T5). In an example, T0-T5 are ranked in a descending order of being selected. Accordingly, the first MTS candidate subset having 1 transform is {T0}, the second MTS candidate subset having 4 transforms is {T0, T1, T2, T3} and the third MTS candidate subset having 6 transform is {T0, T1, T2, T3, T4, T5}.

If an MTS candidate subset (e.g., the last MTS candidate subset) is pre-determined to be the full MTS candidate set, the corresponding number of MTS candidates (the last number, such as the largest number 6) may not need to be signaled, and can be inferred to be the number of candidates in the full MTS candidate set. If an MTS candidate subset (e.g., the first MTS candidate subset) is pre-determined to only include a default transform (e.g., T0 being DCT2), the corresponding number of MTS candidate(s) may not need to be signaled, and can be inferred to be 1.

According to an embodiment of the disclosure, the MTS selection information can be determined based on a previously coded region.

In an embodiment, the MTS selection information indicates threshold information that includes one or more thresholds indicating which MTS candidate subset is used for the TB in a current region (e.g., a current CTU, a current slice, a current picture, or a current group of pictures (GOP)) can be determined (e.g., derived). The one or more thresholds may be determined based on previously coded residue information in the previously coded region (e.g., a previously coded CTU, a previously coded slice, a previously coded picture, or a previously coded GOP). The previously coded region can include a plurality of previously coded blocks (e.g., TBs). The previously coded region can correspond to the current region. In an example, the previously coded region and the current region are slices. In an example, the previously coded region and the current region are pictures. The previously coded residue information can indicate coefficient information of the plurality of previously coded blocks.

In an embodiment, the previously coded residue information indicates coded residues (e.g., coefficients) in the previously coded region. The previously coded residue information (e.g., previously coded coefficient information) can indicate an average number of non-zero coefficients per block (e.g., per TB) in the previously coded region or an average number of the last significant coefficient in the scanning order per block (e.g., per TB) in the previously coded region. In an example, the average number of non-zero coefficients per TB in the previously coded region or the average number of the last significant coefficient in the scanning order per TB in the previously coded region is calculated and/or stored.

The previously coded residue information can be used to determine the one or more thresholds for the current region. For example, the one or more thresholds (e.g., TH[0] and TH[1]) for the plurality of TBs in the current region are determined based on the previously coded residue information, and are not signaled.

In an example, the previously coded residue information from the previously coded region is determined and/or stored based on different types of block sizes (e.g., TB sizes) in the previously coded region. The block size can be measured by a number of samples in a block, a block width, a block height, or the like. An MTS candidate subset selection for a TB in the current region can be determined based on previously coded residue information of a type of block sizes to which the TB belongs, as described below.

The previously coded residue information can include multiple pieces of coefficient information. Each of the multiple pieces of coefficient information can correspond to a respective type of multiple types of block sizes in the previously coded region. In an example, the multiple types of block sizes in the previously coded region include a first type (e.g., a number of samples in a TB being less than or equal to N1) and a second type (e.g., a number of samples in a TB being larger than N1). N1 is a positive integer. The multiple pieces of coefficient information include a first piece of coefficient information and a second piece of coefficient information that correspond to the first type and the second type, respectively. The first piece of coefficient information can be determined based on a first subset of the plurality of previously coded TBs that belongs to the first type. The second piece of coefficient information can be determined based on a second subset of the plurality of previously coded TBs that belongs to the second type.

The current region includes a first TB and a second TB. A first number of samples in the first TB is less than N1, and a second number of samples in the second TB is larger than N1. The first TB belongs to the first type, and the second TB belongs to the second type. First threshold(s) for the first TB can be determined based on the first piece of coefficient information, and second threshold(s) for the second TB can be determined based on the second piece of coefficient information. Subsequently, MTS candidate subsets of the first TB and the second TB can be determined based on the first threshold(s) and the second threshold(s).

According to an embodiment of the disclosure, the MTS selection information determined based on the previously coded region indicates MTS candidate subsets. The MTS candidate subsets (e.g., the three MTS candidate subsets in FIG. 14) selected for a TB in the current region can be determined (e.g., derived) based on previously coded MTS information in the previously coded region.

In an embodiment, the previously coded MTS information includes statistics information (e.g., statistics) of transform types used in the previously coded region. In an example, frequencies of respective transform types (e.g., DCT2, DST7, DCT8, DCT5, DST4, DST1, and IDT) being used in the previously coded region can be determined. For example, the most frequently used transform types per block from the previously coded region can be calculated and/or stored. The previously coded MTS information (e.g., the frequencies of the respective transform types) can be used to determine the transforms (e.g., transform types) in the MTS candidate subsets. The previously coded MTS information can be used to determine an order of MTS candidates in an MTS candidate subset in the current region.

Referring to FIG. 14, the frequencies of the respective transform types used in the previously coded region are T0, T1, T2, T3, T4, and T5 in a descending order. Thus, if MTS candidate subsets with 1, 4, and 6 MTS candidates are to be determined for a TB in the current region, the MTS candidate subsets are the three MTS candidate subsets shown in FIG. 14. For example, the second MTS candidate subset includes T0, T1, T2, and T3 with the most frequently used transform T0 in the previously coded region being first in the second MTS candidate subset.

In an example, the previously coded MTS information from the previously coded region is determined and/or stored based on different types of block sizes (e.g., TB sizes) in the previously coded region, as described above. An MTS candidate subset selection and/or an order of MTS candidates or transforms in the MTS candidate subset for a TB in the current region can be determined based on previously coded MTS information of a type of block sizes to which the TB belong, as described below.

The previously coded MTS information can include multiple pieces of MTS information. Each of the multiple pieces of MTS information can correspond to a respective type of the multiple types of block sizes in the previously coded region. The multiple pieces of MTS information include a first piece of MTS information and a second piece of MTS information that correspond to the first type and the second type, respectively. The first piece of MTS information, such as first frequencies of respective transform types in the first subset of the plurality of previously coded TBs that belong to the first type, can be determined based on the first subset. The second piece of MTS information, such as second frequencies of respective transform types in the second subset of the plurality of previously coded TBs that belong to the second type, can be determined based on the second subset.

The current region includes the first TB and the second TB, as described above. First transforms in first MTS candidate subsets for the first TB can be determined based on the first piece of MTS information, and second transforms in second MTS candidate subsets for the second TB can be determined based on the second piece of MTS information.

Embodiments in the disclosure may be used separately or combined in any order. For example, threshold information indicating threshold(s) for a plurality of TBs in the current region can be signaled in a video bitstream, can be derived based on a previously coded region, or can be pre-determined. A plurality of MTS candidate subsets can be determined based on signaled information and/or derived information, such as threshold(s), numbers of MTS candidates in respective MTS candidate subsets, the previously coded residue information, and/or previously coded MTS information that are described above. An MTS candidate subset for a TB can be determined based on signaled information, derived information, and/or pre-determined information, such as the threshold(s) (e.g., either signaled or derived), the plurality of MTS candidate subsets (e.g., derived or pre-determined), and coefficient information of the TB. The plurality of derived MTS candidate subsets can be determined from the full MTS candidate set that is pre-determined for the encoder and the decoder.

Figure 15:
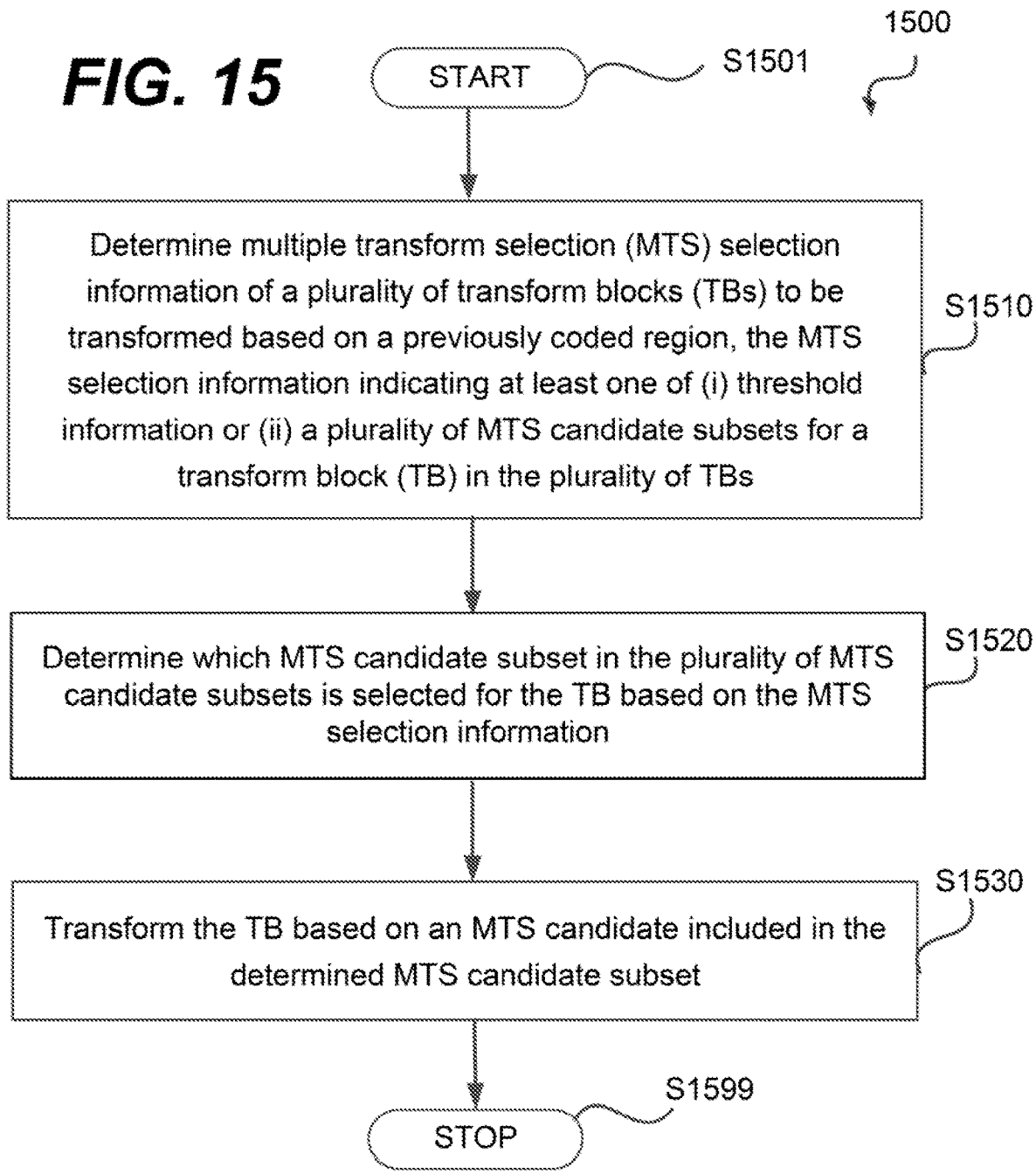
FIG. 15 shows a flow chart outlining an encoding process according to an embodiment of the disclosure.

FIG. 15 shows a flow chart outlining an encoding process (1500) according to an embodiment of the disclosure. In various embodiments, the process (1500) is executed by processing circuitry, such as the processing circuitry in the terminal devices (310), (320), (330) and (340), processing circuitry that performs functions of a video encoder (e.g., (403), (603), (703)), or the like. In some embodiments, the process (1500) is implemented in software instructions, thus when the processing circuitry executes the software instructions, the processing circuitry performs the process (1500). The process starts at (S1501), and proceeds to (S1510).

At (S1510), multiple transform selection (MTS) selection information of a plurality of transform blocks (TBs) to be transformed can be determined based on a previously coded region, such as multiple previously coded TBs in the previously coded region. The MTS selection information can indicate at least one of (i) threshold information or (ii) a plurality of MTS candidate subsets for a transform block (TB) in the plurality of TBs.

At (S1520), which MTS candidate subset in the plurality of MTS candidate subsets is selected for the TB can be determined based on the MTS selection information.

At (S1530), the TB can be transformed based on an MTS candidate included in the determined MTS candidate subset.

In an example, the MTS selection information is encoded. The encoded MTS selection information can be included in a video bitstream.

The process (1500) then proceeds to (S1599), and terminates.

The process (1500) can be suitably adapted to various scenarios and steps in the process (1500) can be adjusted accordingly. One or more of the steps in the process (1500) can be adapted, omitted, repeated, and/or combined. Any suitable order can be used to implement the process (1500). Additional step(s) can be added.

Figure 16:
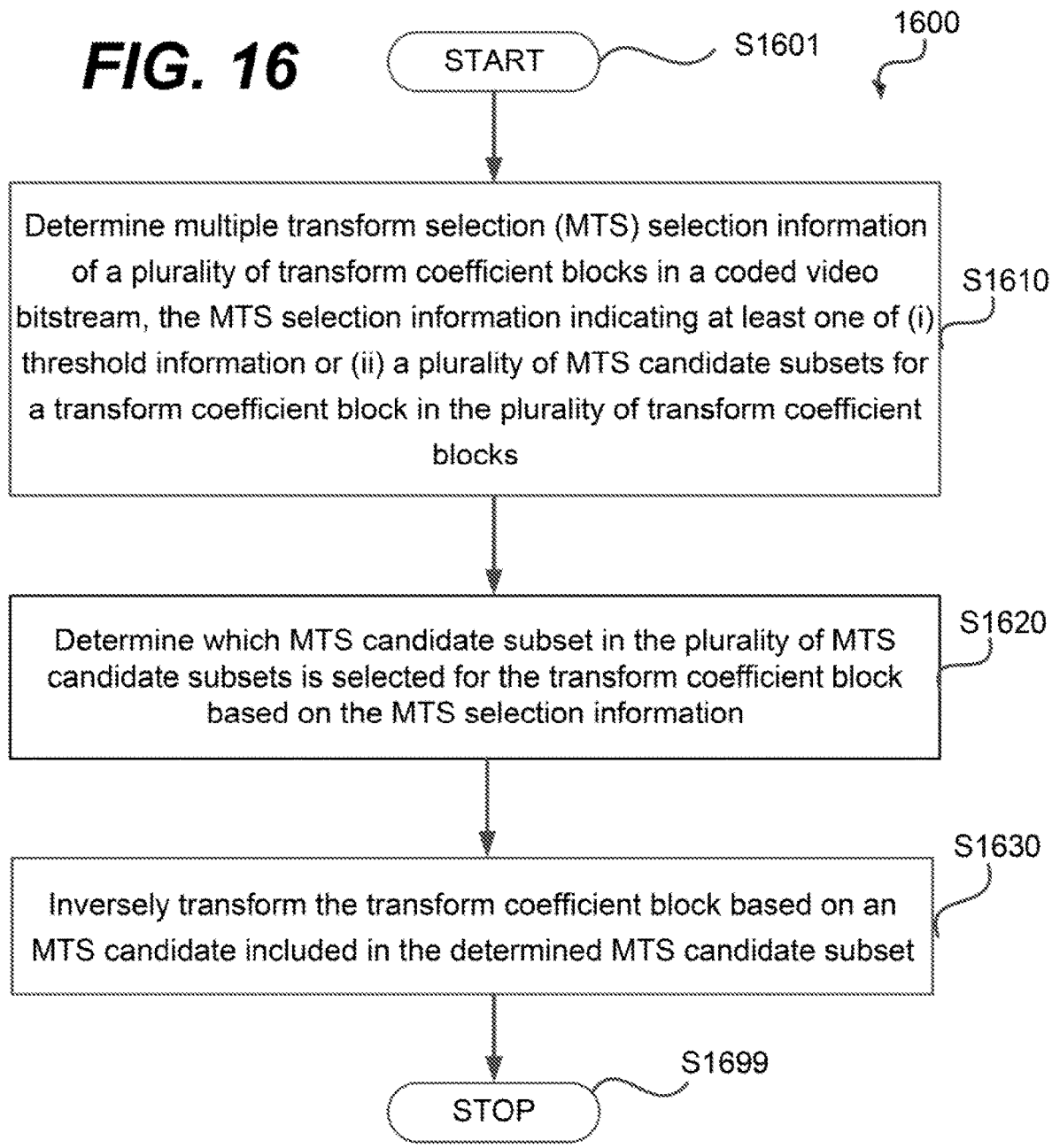
FIG. 16 shows a flow chart outlining a decoding process according to an embodiment of the disclosure.

FIG. 16 shows a flow chart outlining a decoding process (1600) according to an embodiment of the disclosure. In various embodiments, the process (1600) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1600) is implemented in software instructions, thus when the processing circuitry executes the software instructions, the processing circuitry performs the process (1600). The process starts at (S1601), and proceeds to (S1610).

At (S1610), multiple transform selection (MTS) selection information of a plurality of transform coefficient blocks in a coded video bitstream can be determined. The MTS selection information can indicate threshold information and/or a plurality of MTS candidate subsets for a transform coefficient block in the plurality of transform coefficient blocks. In an example, the MTS selection information is applicable to the plurality of transform coefficient blocks.

In an embodiment, the MTS selection information is signaled in the coded video bitstream.

At (S1620), which MTS candidate subset in the plurality of MTS candidate subsets is selected for the transform coefficient block can be determined based on the MTS selection information.

In an example, the MTS selection information signaled in the coded video bitstream indicates the threshold information that includes at least one threshold. The MTS candidate subset can be determined based on the at least one threshold and one of (i) a number of non-zero coefficients in the transform coefficient block or (ii) a position of the last significant coefficient in a scanning order in the transform coefficient block.

In an example, a number of the plurality of MTS candidate subsets is a sum of a number of the at least one threshold and 1. The plurality of MTS candidate subsets can be determined based on the number of the plurality of MTS candidate subsets and the MTS candidate subset can be determined based on the plurality of MTS candidate subsets.

In an embodiment, the MTS selection information signaled in the coded video bitstream includes one or more numbers. Each number of the one or more numbers is a number of one or more MTS candidates in a respective one of one or more MTS candidate subsets in the plurality of MTS candidate subsets. The plurality of MTS candidate subsets can be determined based on the one or more numbers and an MTS candidate set. The MTS candidate subset can be determined based on the plurality of MTS candidate subsets. In an example, the plurality of MTS candidate subsets includes a last MTS candidate subset that is not included in the one or more MTS candidate subsets, and the last MTS candidate subset is the MTS candidate set. In an example, the plurality of MTS candidate subsets includes a first MTS candidate subset that is not included in the one or more MTS candidate subsets, and the first MTS candidate subset consists of a default MTS candidate in the MTS candidate set.

In an embodiment, the MTS selection information is determined based on multiple previously decoded transform coefficient blocks in a previously decoded region. The MTS selection information indicates the threshold information that includes at least one threshold of the plurality of transform coefficient blocks. The at least one threshold can be determined based on coefficient information of the multiple previously decoded transform coefficient blocks. The MTS candidate subset can be determined based on the at least one threshold and one of (i) a number of non-zero coefficients in the transform coefficient block or (ii) a position of the last significant coefficient in a scanning order in the transform coefficient block.

In an example, the coefficient information of the multiple previously decoded transform coefficient blocks indicates (i) an average number of non-zero coefficients of the multiple previously decoded transform coefficient blocks or (ii) an average position of the last significant coefficient in a scanning order of the multiple previously decoded transform coefficient blocks.

In an example, the MTS selection information indicates the threshold information that includes at least one threshold of the plurality of transform coefficient blocks. Multiple pieces of coefficient information are associated with the multiple previously decoded transform coefficient blocks. Each of the multiple pieces of coefficient information corresponds to a respective type of multiple types of block sizes in the previously decoded region. The at least one threshold can be determined based on a piece of coefficient information corresponding to a respective type of block sizes to which the transform coefficient block belong. The MTS candidate subset can be determined based on the at least one threshold and one of (i) a number of non-zero coefficients in the transform coefficient block or (ii) a position of the last significant coefficient in a scanning order in the transform coefficient block.

In an example, the MTS selection information indicates the plurality of MTS candidate subsets. For the plurality of transform coefficient blocks, MTS candidates and an order of the MTS candidates that are used to form the plurality of MTS candidate subsets from an MTS candidate set can be determined based on statistics information of transform types of the multiple previously decoded transform coefficient blocks. The plurality of MTS candidate subsets can be determined from the MTS candidate set based on the MTS candidates and the order of the MTS candidates. The MTS candidate subset can be determined to be one of the plurality of MTS candidate subsets.

In an example, the MTS selection information indicates the plurality of MTS candidate subsets. Multiple pieces of statistics information of transform types are associated with the multiple previously decoded transform coefficient blocks. Each of the multiple pieces of statistics information of transform types corresponds to a respective type of multiple types of block sizes in the previously decoded region. For the transform coefficient block, MTS candidates and an order of the MTS candidates that is used to form the plurality of MTS candidate subsets from an MTS candidate set can be determined based on a piece of statistics information of transform types corresponding to a type of block sizes to which the transform coefficient block belong. The plurality of MTS candidate subsets from the MTS candidate set can be determined based on the MTS candidates and the order of the MTS candidates. The MTS candidate subset can be determined to be one of the plurality of MTS candidate subsets.

At (S1630), the transform coefficient block can be inversely transformed based on an MTS candidate included in the determined MTS candidate subset.

The process (1600) proceeds to (S1699), and terminates.

The process (1600) can be suitably adapted to various scenarios and steps in the process (1600) can be adjusted accordingly. One or more of the steps in the process (1600) can be adapted, omitted, repeated, and/or combined. Any suitable order can be used to implement the process (1600). Additional step(s) can be added.

Figure 17:
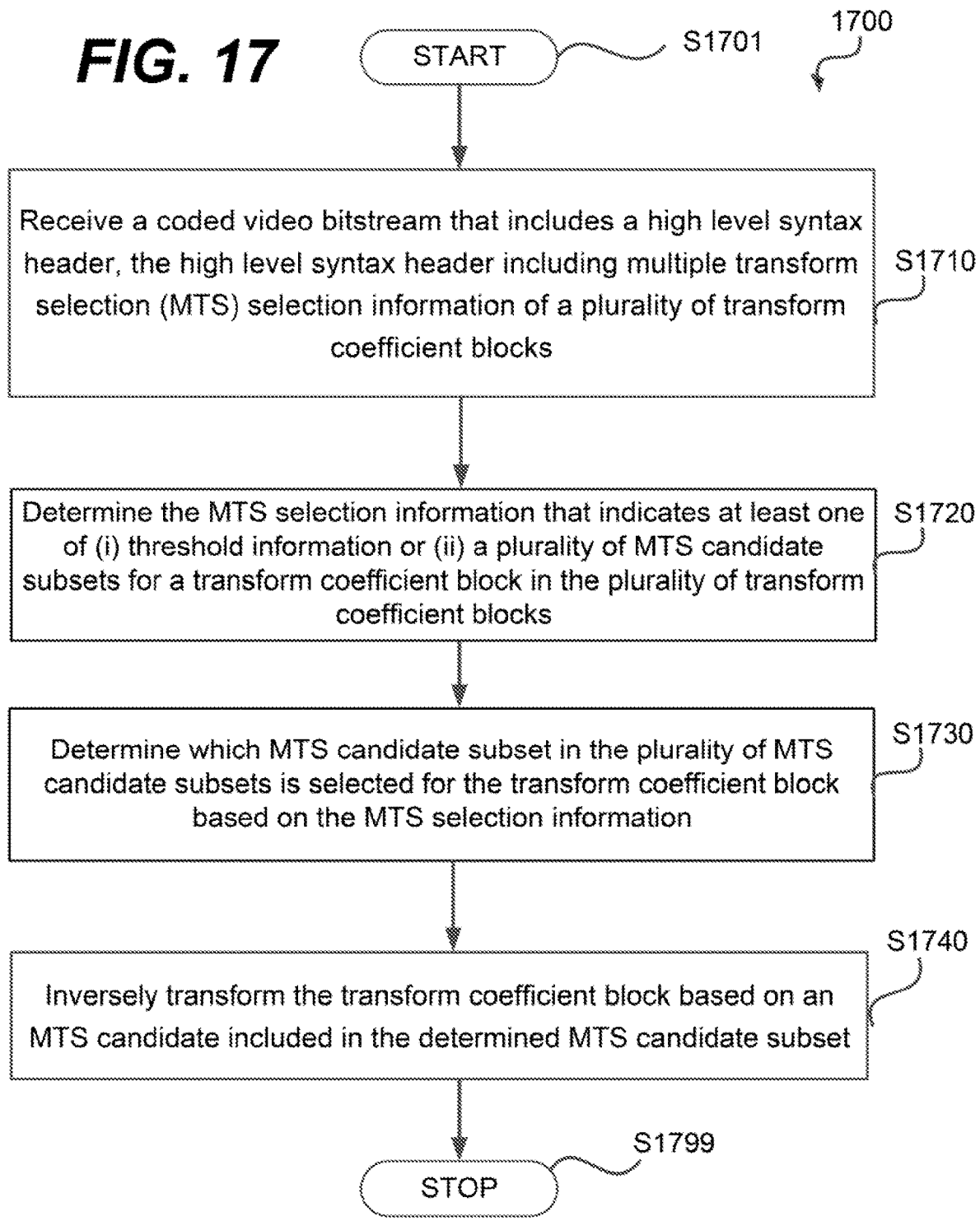
FIG. 17 shows a flow chart outlining a decoding process according to an embodiment of the disclosure.

FIG. 17 shows a flow chart outlining a decoding process (1700) according to an embodiment of the disclosure. In various embodiments, the process (1700) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1700) is implemented in software instructions, thus when the processing circuitry executes the software instructions, the processing circuitry performs the process (1700). The process starts at (S1701), and proceeds to (S1710).

At (S1710), a coded video bitstream that includes a high level syntax header is received. The high level syntax header includes multiple transform selection (MTS) selection information of a plurality of transform coefficient blocks.

At (S1720), the MTS selection information that indicates at least one of (i) threshold information or (ii) a plurality of MTS candidate subsets for a transform coefficient block in the plurality of transform coefficient blocks is determined.

At (S1730), which MTS candidate subset in the plurality of MTS candidate subsets is selected for the transform coefficient block is determined based on the MTS selection information.

At (S1740), the transform coefficient block can be inversely transformed based on an MTS candidate included in the determined MTS candidate subset.

The process (1700) proceeds to (S1799), and terminates.

The process (1700) can be suitably adapted to various scenarios and steps in the process (1700) can be adjusted accordingly. One or more of the steps in the process (1700) can be adapted, omitted, repeated, and/or combined. Any suitable order can be used to implement the process (1700). Additional step(s) can be added.

Figure 18:
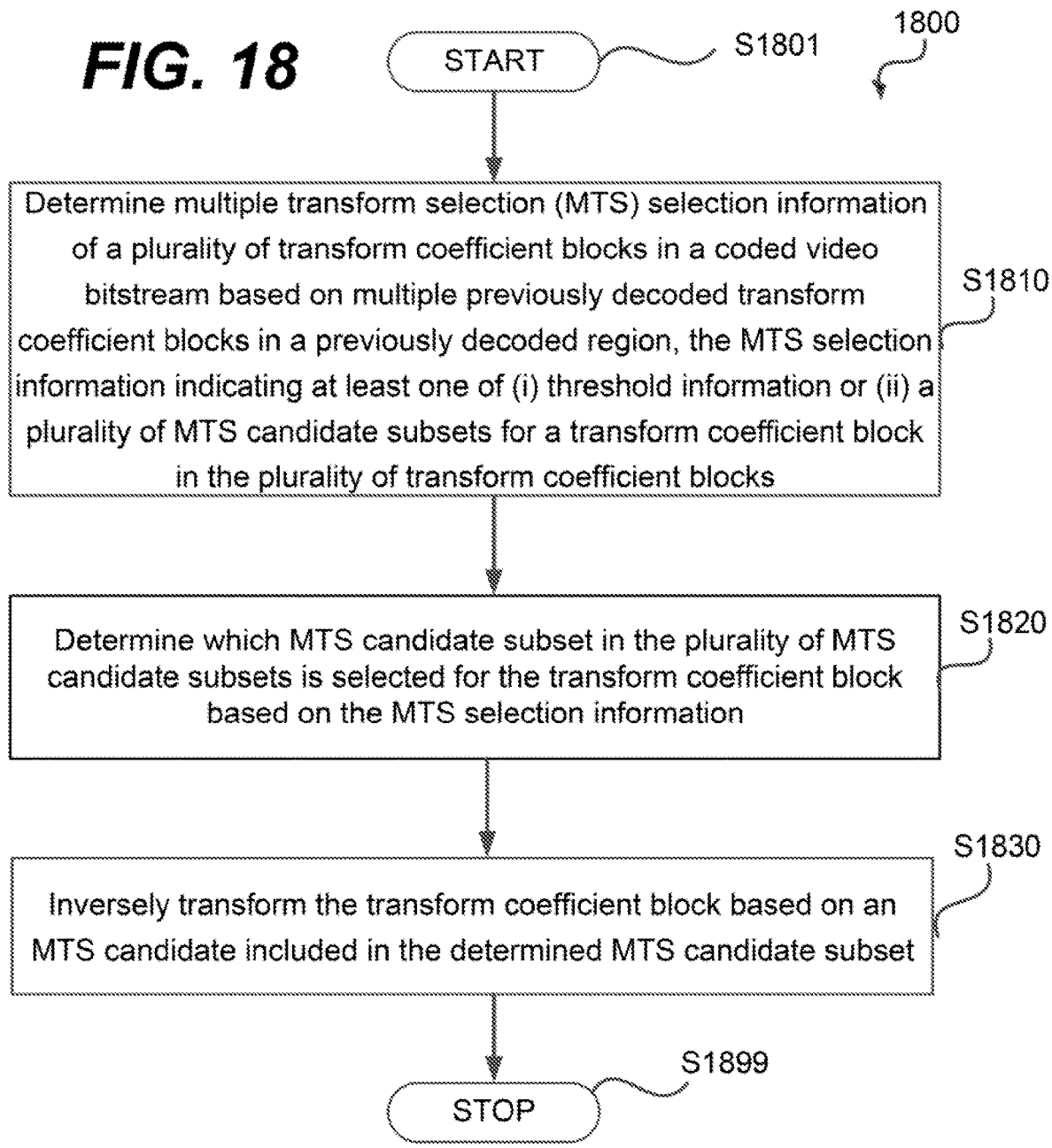
FIG. 18 shows a flow chart outlining a decoding process according to an embodiment of the disclosure.

FIG. 18 shows a flow chart outlining a decoding process (1800) according to an embodiment of the disclosure. In various embodiments, the process (1800) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1800) is implemented in software instructions, thus when the processing circuitry executes the software instructions, the processing circuitry performs the process (1800). The process starts at (S1801), and proceeds to (S1810).

At (S1810), multiple transform selection (MTS) selection information of a plurality of transform coefficient blocks in a coded video bitstream can be determined based on multiple previously decoded transform coefficient blocks in a previously decoded region. The MTS selection information indicates at least one of (i) threshold information or (ii) a plurality of MTS candidate subsets for a transform coefficient block in the plurality of transform coefficient blocks.

At (S1820), which MTS candidate subset in the plurality of MTS candidate subsets is selected for the transform coefficient block is determined based on the MTS selection information.

At (S1830), the transform coefficient block can be inversely transformed based on an MTS candidate included in the determined MTS candidate subset.

The process (1800) proceeds to (S1899), and terminates.

The process (1800) can be suitably adapted to various scenarios and steps in the process (1800) can be adjusted accordingly. One or more of the steps in the process (1800) can be adapted, omitted, repeated, and/or combined. Any suitable order can be used to implement the process (1800). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above can be implemented as computer software using computer-readable instructions and physically stored in one or more computer-readable media. For example, FIG. 19 shows a computer system (1900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
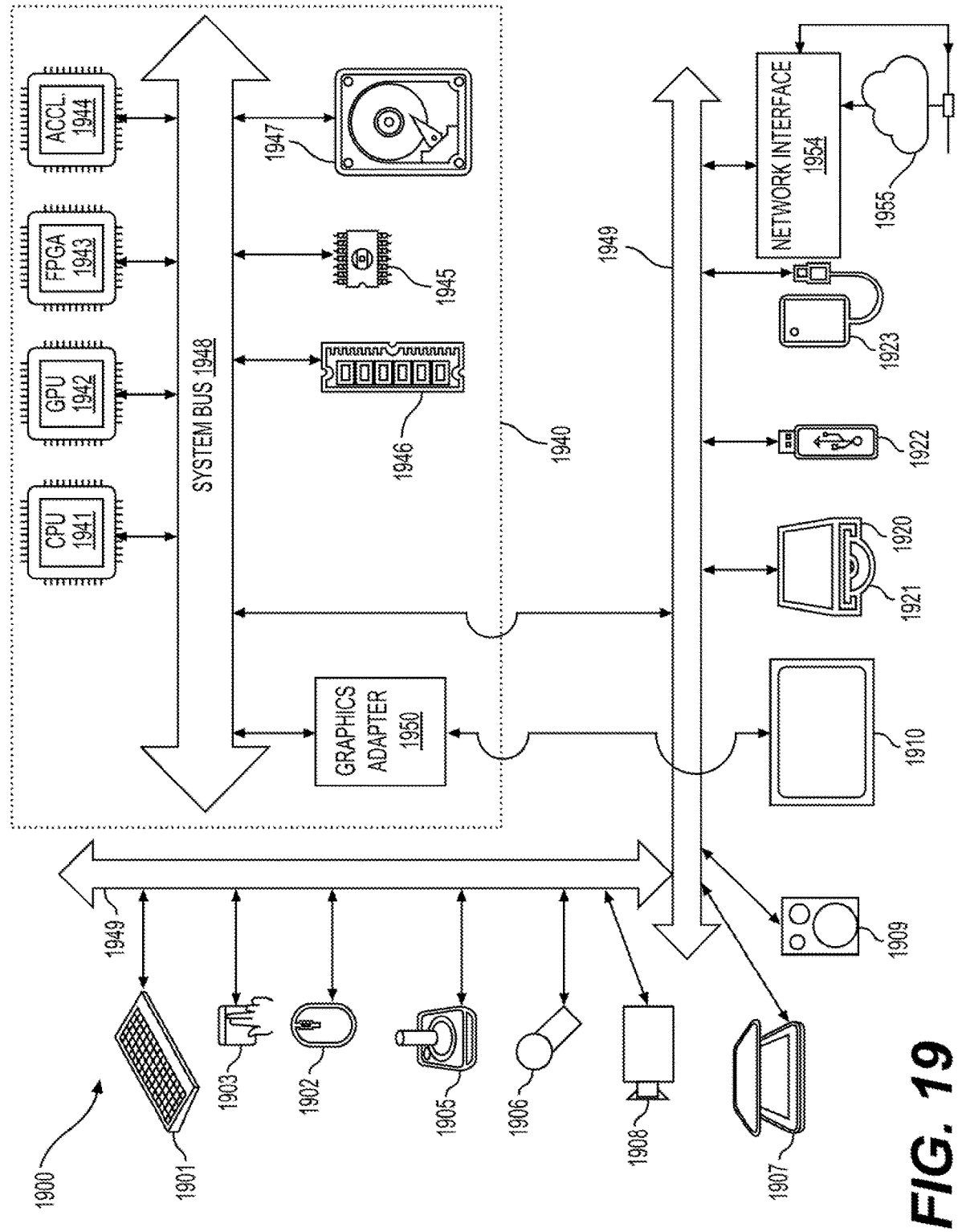
FIG. 19 is a schematic illustration of a computer system in accordance with an embodiment.

The components shown in FIG. 19 for computer system (1900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1900).

Computer system (1900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1901), mouse (1902), trackpad (1903), touch-screen (1910), data-glove (not shown), joystick (1905), microphone (1906), scanner (1907), camera (1908).

Computer system (1900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1910), data-glove (not shown), or joystick (1905), but there can also be tactile feedback devices that do not serve as input devices), audio output devices (such as: speakers (1909), headphones (not depicted)), visual output devices (such as screens (1910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1900) can also include human accessible storage devices and their associated media such as optical media including CD/DVD ROM/RW (1920) with CD/DVD or the like media (1921), thumb-drive (1922), removable hard drive or solid state drive (1923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1900) can also include an interface (1954) to one or more communication networks (1955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1949) (such as, for example USB ports of the computer system (1900)); others are commonly integrated into the core of the computer system (1900) by attachment to a system bus as described below (for example Ethernet interface into a PC computer system or cellular network interface into a smartphone computer system). Using any of these networks, computer system (1900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1940) of the computer system (1900).

The core (1940) can include one or more Central Processing Units (CPU) (1941), Graphics Processing Units (GPU) (1942), specialized programmable processing units in the form of Field Programmable Gate Areas (FPGA) (1943), hardware accelerators for certain tasks (1944), graphics adapters (1950), and so forth. These devices, along with Read-only memory (ROM) (1945), Random-access memory (1946), internal mass storage such as internal non-user accessible hard drives, SSDs, and the like (1947), may be connected through a system bus (1948). In some computer systems, the system bus (1948) can be accessible in the form of one or more physical plugs to enable extensions by additional CPUs, GPU, and the like. The peripheral devices can be attached either directly to the core's system bus (1948), or through a peripheral bus (1949). In an example, the screen (1910) can be connected to the graphics adapter (1950). Architectures for a peripheral bus include PCI, USB, and the like.

CPUs (1941), GPUs (1942), FPGAs (1943), and accelerators (1944) can execute certain instructions that, in combination, can make up the aforementioned computer code. That computer code can be stored in ROM (1945) or RAM (1946). Transitional data can be stored in RAM (1946), whereas permanent data can be stored for example, in the internal mass storage (1947). Fast storage and retrieve to any of the memory devices can be enabled through the use of cache memory, that can be closely associated with one or more CPU (1941), GPU (1942), mass storage (1947), ROM (1945), RAM (1946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1900), and specifically the core (1940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1940) that are of non-transitory nature, such as core-internal mass storage (1947) or ROM (1945). The software implementing various embodiments of the present disclosure can be stored in such devices and executed by core (1940). A computer-readable medium can include one or more memory devices or chips, according to particular needs. The software can cause the core (1940) and specifically the processors therein (including CPU, GPU, FPGA, and the like) to execute particular processes or particular parts of particular processes described herein, including defining data structures stored in RAM (1946) and modifying such data structures according to the processes defined by the software. In addition or as an alternative, the computer system can provide functionality as a result of logic hardwired or otherwise embodied in a circuit (for example: accelerator (1944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, the method comprising:
   receiving a coded video bitstream that includes a high level syntax header, the high level syntax header including multiple transform selection (MTS) selection information of a plurality of transform coefficient blocks;
   determining the MTS selection information that indicates at least one of (i) threshold information associated with a plurality of MTS candidate subsets for a transform coefficient block in the plurality of transform coefficient blocks or (ii) the plurality of MTS candidate subsets for the transform coefficient block in the plurality of transform coefficient blocks;
   determining which MTS candidate subset in the plurality of MTS candidate subsets is selected for the transform coefficient block based on the MTS selection information;
   determining an MTS candidate from the determined MTS candidate subset; and
   inversely transforming the transform coefficient block based on the MTS candidate included in the determined MTS candidate subset.

2. The method of claim 1, wherein
   the MTS selection information indicates the threshold information that includes at least one threshold; and
   the determining which MTS candidate subset further includes determining the MTS candidate subset based on the at least one threshold and one of (i) a number of non-zero coefficients in the transform coefficient block or (ii) a position of the last significant coefficient in a scanning order in the transform coefficient block.

3. The method of claim 2, wherein
   a number of the plurality of MTS candidate subsets is a sum of a number of the at least one threshold and 1; and
   the determining which MTS candidate subset includes:
      determining the plurality of MTS candidate subsets based on the number of the plurality of MTS candidate subsets; and
      determining the MTS candidate subset further based on the plurality of MTS candidate subsets.

4. The method of claim 1, wherein
   the MTS selection information includes one or more numbers, each number of the one or more numbers being a number of one or more MTS candidates in a respective one of one or more MTS candidate subsets in the plurality of MTS candidate subsets; and
   the determining which MTS candidate subset further includes:
      determining the plurality of MTS candidate subsets based on the one or more numbers and an MTS candidate set; and
      determining the MTS candidate subset based on the plurality of MTS candidate subsets.

5. The method of claim 4, wherein
   the plurality of MTS candidate subsets includes a last MTS candidate subset that is not included in the one or more MTS candidate subsets, and
   the last MTS candidate subset is the MTS candidate set.

6. The method of claim 4, wherein
   the plurality of MTS candidate subsets includes a first MTS candidate subset that is not included in the one or more MTS candidate subsets, and
   the first MTS candidate subset consists of a default MTS candidate in the MTS candidate set.

7. The method of claim 1, wherein the high level syntax header is a slice header, a picture header, a picture parameter set (PPS), a video parameter set (VPS), an adaptation parameter set (APS), or a sequence parameter set (SPS).

8. A method for video encoding in a video encoder, the method comprising:
   determining which multiple transform selection (MTS) candidate subset in a plurality of MTS candidate subsets is selected for a transform coefficient block based on MTS selection information that indicates at least one of (i) threshold information associated with the plurality of MTS candidate subsets for the transform coefficient block in a plurality of transform coefficient blocks or (ii) the plurality of MTS candidate subsets for the transform coefficient block in the plurality of transform coefficient blocks;

determining an MTS candidate from the determined MTS candidate subset;

encoding the transform coefficient block in a bitstream based on the MTS candidate included in the determined MTS candidate subset; and encoding a high level syntax header in the bitstream, the high level syntax header including the MTS selection information of the plurality of transform coefficient blocks.

9. The method of claim 8, wherein the MTS selection information indicates the threshold information that includes at least one threshold; and the determining which MTS candidate subset further includes determining the MTS candidate subset based on the at least one threshold and one of (i) a number of non-zero coefficients in the transform coefficient block or (ii) a position of the last significant coefficient in a scanning order in the transform coefficient block.

10. The method of claim 9, wherein a number of the plurality of MTS candidate subsets is a sum of a number of the at least one threshold and 1; and the determining which MTS candidate subset includes:
  determining the plurality of MTS candidate subsets based on the number of the plurality of MTS candidate subsets; and
  determining the MTS candidate subset further based on the plurality of MTS candidate subsets.

11. The method of claim 8, wherein the MTS selection information includes one or more numbers, each number of the one or more numbers being a number of one or more MTS candidates in a respective one of one or more MTS candidate subsets in the plurality of MTS candidate subsets; and the determining which MTS candidate subset further includes:
  determining the plurality of MTS candidate subsets based on the one or more numbers and an MTS candidate set; and
  determining the MTS candidate subset based on the plurality of MTS candidate subsets.

12. The method of claim 11, wherein the plurality of MTS candidate subsets includes a last MTS candidate subset that is not included in the one or more MTS candidate subsets, and the last MTS candidate subset is the MTS candidate set.

13. The method of claim 11, wherein the plurality of MTS candidate subsets includes a first MTS candidate subset that is not included in the one or more MTS candidate subsets, and the first MTS candidate subset consists of a default MTS candidate in the MTS candidate set.

14. The method of claim 8, wherein the high level syntax header is a slice header, a picture header, a picture parameter set (PPS), a video parameter set (VPS), an adaptation parameter set (APS), or a sequence parameter set (SPS).

15. A method of processing visual media data, the method comprising:

processing a bitstream that includes the visual media data according to a format rule, wherein the bitstream includes a high level syntax header, the high level syntax header including multiple transform selection (MTS) selection information of a plurality of transform coefficient blocks; and the format rule specifies that:

the MTS selection information indicates at least one of (i) threshold information associated with a plurality of MTS candidate subsets for a transform coefficient block in the plurality of transform coefficient blocks or (ii) the plurality of MTS candidate subsets for the transform coefficient block in the plurality of transform coefficient blocks, which MTS candidate subset in the plurality of MTS candidate subsets is selected for the transform coefficient block is determined based on the MTS selection information, an MTS candidate is determined from the determined MTS candidate subset, and the transform coefficient block is inversely transformed based on the MTS candidate included in the determined MTS candidate subset.

16. The method of claim 15, wherein the format rule specifies that:

the MTS selection information indicates the threshold information that includes at least one threshold; and the MTS candidate subset is determined based on the at least one threshold and one of (i) a number of non-zero coefficients in the transform coefficient block or (ii) a position of the last significant coefficient in a scanning order in the transform coefficient block.

17. The method of claim 16, wherein the format rule specifies that:

a number of the plurality of MTS candidate subsets is a sum of a number of the at least one threshold and 1;

the plurality of MTS candidate subsets is determined based on the number of the plurality of MTS candidate subsets; and the MTS candidate subset is further determined based on the plurality of MTS candidate subsets.

18. The method of claim 15, wherein the format rule specifies that:

the MTS selection information includes one or more numbers, each number of the one or more numbers being a number of one or more MTS candidates in a respective one of one or more MTS candidate subsets in the plurality of MTS candidate subsets;

the plurality of MTS candidate subsets is determined based on the one or more numbers and an MTS candidate set; and the MTS candidate subset is determined based on the plurality of MTS candidate subsets.

19. The method of claim 18, wherein the format rule specifies that:

the plurality of MTS candidate subsets includes a last MTS candidate subset that is not included in the one or more MTS candidate subsets, and the last MTS candidate subset is the MTS candidate set.

20. The method of claim 18, wherein the format rule specifies that:

the plurality of MTS candidate subsets includes a first MTS candidate subset that is not included in the one or more MTS candidate subsets, and the first MTS candidate subset consists of a default MTS candidate in the MTS candidate set.

* * * * *